United States Patent
Hamada

(10) Patent No.: US 12,371,293 B2
(45) Date of Patent: Jul. 29, 2025

(54) MEDIUM TRANSPORT APPARATUS AND IMAGE READING APPARATUS

(71) Applicant: SEIKO EPSON CORPORATION, Tokyo (JP)

(72) Inventor: Yuhei Hamada, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 260 days.

(21) Appl. No.: 18/156,837

(22) Filed: Jan. 19, 2023

(65) Prior Publication Data

US 2023/0234801 A1 Jul. 27, 2023

(30) Foreign Application Priority Data

Jan. 21, 2022 (JP) .................. 2022-008083

(51) Int. Cl.
*B65H 29/60* (2006.01)
*H04N 1/00* (2006.01)

(52) U.S. Cl.
CPC ......... *B65H 29/60* (2013.01); *H04N 1/00588* (2013.01); *H04N 1/00612* (2013.01); *B65H 2402/31* (2013.01); *B65H 2801/39* (2013.01)

(58) Field of Classification Search
CPC ............... B65H 2402/31; B65H 29/60; B65H 2801/39; H04N 1/00535; H04N 1/00612
See application file for complete search history.

(56) References Cited

U.S. PATENT DOCUMENTS

| | | | | |
|---|---|---|---|---|
| 5,237,381 A | * | 8/1993 | Hamada | G03G 15/6576 |
| | | | | 162/197 |
| 6,511,241 B2 | * | 1/2003 | Fetherolf | G03G 15/6552 |
| | | | | 347/139 |
| 11,716,431 B2 | * | 8/2023 | Matsuyama | H04N 1/00774 |
| | | | | 358/1.12 |
| 2007/0188818 A1 | * | 8/2007 | Westcott | H04N 1/00583 |
| | | | | 358/296 |
| 2014/0191467 A1 | * | 7/2014 | Miura | H04N 1/0071 |
| | | | | 271/264 |
| 2021/0306492 A1 | | 9/2021 | Nakashima et al. | |
| 2023/0247155 A1 | * | 8/2023 | Hamada | B65H 29/14 |
| | | | | 271/278 |

FOREIGN PATENT DOCUMENTS

JP 2012-246098 12/2012
JP 2012-246099 A 12/2012

* cited by examiner

*Primary Examiner* — Howard J Sanders
(74) *Attorney, Agent, or Firm* — WORKMAN NYDEGGER

(57) ABSTRACT

A medium transport apparatus includes a main body that is switchable between a first posture and a second posture and a rotatable route-forming member that forms an exterior of a turning route. The route-forming member couples a first transport route to a second transport route when the main body has the first posture and couples the first transport route to a third transport route when the main body has the second posture. The medium transport apparatus further includes a transport route switching section having a switching member that engages with both the body support and the route-forming member. In response to switching between the first posture and the second posture of the main body, engagement of the switching member with the main-body support changes to rotate the route-forming member and to switch the medium transport route to which the first transport route is coupled.

16 Claims, 25 Drawing Sheets

MEDIUM TRANSPORT APPARATUS AND IMAGE READING APPARATUS

The present application is based on, and claims priority from JP Application Serial Number 2022-008083, filed Jan. 21, 2022, the disclosure of which is hereby incorporated by reference herein in its entirety.

BACKGROUND

1. Technical Field

The present disclosure relates to a medium transport apparatus that transports a medium and to an image reading apparatus equipped with such a medium transport apparatus.

2. Related Art

Sheet feed scanners (referred to below simply as scanners) are an example of image reading apparatuses as well as an example of medium transport apparatuses that transport a medium. JP-A-2012-246099 discloses a scanner with a small footprint, which includes a curved transport route inclined with respect to the horizontal surface. When a sheet is transported along this transport route, it is turned and then ejected diagonally upward to the outside.

In the above scanner, the transport route is partly exposed so as to be switchable between a curved path and a straight path. By switching the transport route from the curved path to the straight path, the scanner can appropriately eject even hard or thick sheets. The scanner has a lever in a curved member forming the curved path. A user can operate this lever to switch the transport route between the curved path and the straight path.

The disclosed scanner may fail to provide good usability because a user needs to operate the lever in order to change the posture of the curved member. There is therefore a demand for a scanner with improved usability, which allows a user to switch the posture of the curved member without performing a specific operation.

SUMMARY

According to a first aspect of the present disclosure, a medium transport apparatus includes: a main-body support mounted on an installation surface of the medium transport apparatus; and a main body supported by the main-body support. The main body includes: a first transport route along which a medium is to be transported; a second transport route that includes a turning route by which the medium being transported is to be turned upward and from which the medium that was turned by the turning route is to be ejected, the second transport route being disposed downstream of the first transport route; a third transport route from which the medium being transported is to be ejected without being turned, the third transport route being disposed downstream of the first transport route; and a transport route switching section that switches a medium transport route to which the first transport route is coupled, between the second transport route and the third transport route. The main body is rotatably attached to the main-body support and is switchable between a first posture and a second posture by being rotated. An angle between the first transport route and the installation surface when the main body is switched to the first posture is greater than the angle between the first transport route and the installation surface when the main body is switched to the second posture. The turning route has an exterior formed by a route-forming member, the route-forming member being rotatable. When the main body is switched to the first posture, the route-forming member has a first transport route coupling posture by which the first transport route is coupled to the second transport route. When the main body is switched to the second posture, the route-forming member has a second transport route coupling posture by which the first transport route is coupled to the third transport route. The transport route switching section has a switching member that engages with both the main-body support and the route-forming member, the switching member being a rotatable member. In response to switching between the first posture and the second posture of the main body, engagement of the switching member with the main-body support changes to rotate the route-forming member and to switch the medium transport route to which the first transport route is coupled.

According to a second aspect of the present disclosure, a medium transport apparatus includes: a main-body support mounted on an installation surface of the medium transport apparatus; and a main body supported by the main-body support. The main body includes: a first transport route along which a medium is to be transported; a second transport route that includes a turning route by which the medium being transported is to be turned upward and from which the medium that was turned by the turning route is to be ejected, the second transport route being disposed downstream of the first transport route; and a third transport route from which the medium being transported is to be ejected without being turned, the third transport route being disposed downstream of the first transport route. The main body is rotatably attached to the main-body support and is switchable between a first posture and a second posture by being rotated. An angle between the first transport route and the installation surface when the main body is switched to the first posture is greater than the angle between the first transport route and the installation surface when the main body is switched to the second posture. A portion of the body support is a route-forming section that forms an exterior of the turning route. When the main body is switched to the first posture, the route-forming member couples the first transport route to the second transport route. When the main body is switched to the second posture, the route-forming member couples the first transport route to the third transport route.

According to a third aspect of the present disclosure, a medium transport apparatus includes: a main body that is a base component of the medium transport apparatus; and an exposing/hiding unit that is opened to expose or is closed to hide a portion of the main body. The main body includes: a first transport route along which a medium is to be transported; a second transport route that includes a turning route by which the medium being transported is to be turned upward and from which the medium that was turned by the turning route is to be ejected, the second transport route being disposed downstream of the first transport route; a third transport route from which the medium being transported is to be ejected without being turned, the third transport route being disposed downstream of the first transport route; and a transport route switching section that switches a medium transport route to which the first transport route is coupled, between the second transport route and the third transport route. The exposing/hiding unit exposes or hides an ejection port for the medium to be transported along the third transport route. The route-forming member is rotatable and forms an exterior of the turning route. When the exposing/hiding unit is closed, the route-forming member has a first transport route coupling posture by which the first transport route is coupled to the second transport route. When the exposing/hiding unit is opened, the route-forming member has a second transport route coupling posture by which the first transport route is coupled to the third transport route. The transport route switching section has a switching member that engages with both the exposing/hiding unit and the route-forming member, the switching member being a rotatable member. In response to opening or closing of the exposing/hiding unit, engagement of the switching member with the exposing/hiding unit changes to rotate the route-forming member and to switch the medium transport route to which the first transport route is coupled.

According to a fourth aspect of the present disclosure, an image reading apparatus includes: one of the above medium transport apparatuses; and a reader that reads a medium, the reader being disposed on the first transport route in the one of the medium transport apparatuses.

DESCRIPTION OF EXEMPLARY EMBODIMENTS

Figure 1:
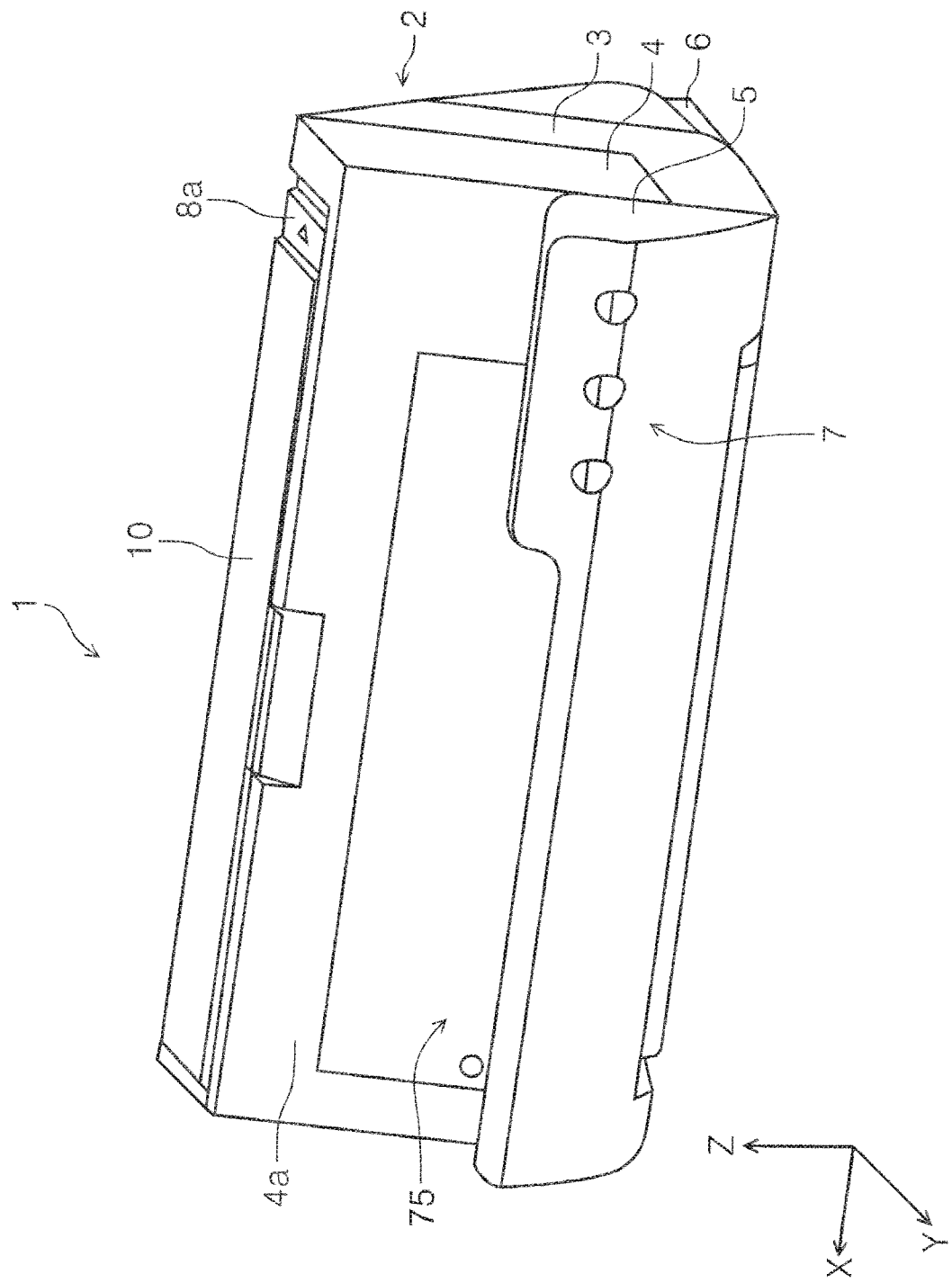
FIG. 1 is a front perspective view of a scanner with a main body being in a regular reading posture.

Some aspects of the present disclosure will be described below. According to a first aspect of the present disclosure, a medium transport apparatus includes: a main-body support mounted on an installation surface of the medium transport apparatus; and a main body supported by the main-body support. The main body includes: a first transport route along which a medium is to be transported; a second transport route that includes a turning route by which the medium being transported is to be turned upward and from which the medium that was turned by the turning route is to be ejected, the second transport route being disposed downstream of the first transport route; a third transport route from which the medium being transported is to be ejected without being turned, the third transport route being disposed downstream of the first transport route; and a transport route switching section that switches a medium transport route to which the first transport route is coupled, between the second transport route and the third transport route. The main body is rotatably attached to the main-body support and is switchable between a first posture and a second posture by being rotated. An angle between the first transport route and the installation surface when the main body is switched to the first posture is greater than the angle between the first transport route and the installation surface when the main body is switched to the second posture. The turning route has an exterior formed by a route-forming member, the route-forming member being rotatable. When the main body is switched to the first posture, the route-forming member has a first transport route coupling posture by which the first transport route is coupled to the second transport route. When the main body is switched to the second posture, the route-forming member has a second transport route coupling posture by which the first transport route is coupled to the third transport route. The transport route switching section has a switching member that engages with both the main-body support and the route-forming member, the switching member being a rotatable member. In response to switching between the first posture and the second posture of the main body, engagement of the switching member with the main-body support changes to rotate the route-forming member and to switch the medium transport route to which the first transport route is coupled.

In a medium transport apparatus of the first aspect, the engagement of a switching member with a main-body support changes in response to the switching between a first posture and a second posture of the main body, thereby rotating a route-forming member and switching a medium transport route to which a first transport route is coupled. This configuration selects an appropriate medium transport route in accordance with the posture of the main body without involving a specific operation of switching the posture of the route-forming member; it is therefore possible to provide improved usability.

According to a second aspect of the present disclosure, the medium transport apparatus may have, in addition to the configuration of the first aspect, a configuration in which the transport route switching section includes a first pushing member and a second pushing member, the first pushing member being configured to push the route-forming member so as to have the first transport route coupling posture, the second pushing member being configured to push the switching member in a direction in which the switching member pushes the route-forming member so as to have the second transport route coupling posture. Pushing force of the second pushing member may be greater than pushing force of the first pushing member. When the main body is switched to the first posture, the switching member may abut against the main-body support and may not push the route-forming member, and the route-forming member may receive the pushing force of the first pushing member and may have the first transport route coupling posture. When the main body is switched to the second posture, the switching member may move away from the main-body support and may push the route-forming member against the pushing force of the first pushing member, and the route-forming member may have the second transport route coupling posture.

According to a third aspect of the present disclosure, the medium transport apparatus may have, in addition to the configuration of the first aspect, a configuration in which the transport route switching section includes a first pushing member and a second pushing member, the first pushing member being configured to push the route-forming member so as to have the first transport route coupling posture, the second pushing member being configured to push the switching member in a direction in which the switching member pushes the route-forming member so as to have the second transport route coupling posture. The first pushing member may be attached to both the switching member and the route-forming member. When the main body is switched to the first posture, the switching member may abut against the main-body support, and the route-forming member may receive the pushing force of the first pushing member and have the first transport route coupling posture. When the main body is switched to the second posture, the switching member may move away from the main-body support and push the route-forming member, and the route-forming member may have the second transport route coupling posture.

According to a fourth aspect of the present disclosure, the medium transport apparatus may further include, in addition to the configuration of the third aspect, a turning route guide member that receives a medium from the route-forming member and guides the medium in a downstream direction, the turning route guide member being a member forming the exterior of the turning route, the turning route guide member being disposed downstream of the route-forming member. Each of the route-forming member and the turning route guide member may have a plurality of teeth arranged in a width direction, the width direction intersecting a transport direction of the medium. Lower ends of the teeth of the route-forming member may engage with upper ends of the teeth of the turning route guide member, and at least some of the teeth arranged in the width direction may be coupled together.

If a route-forming member is deformed by receiving force from a medium, a reverse step may be formed between the route-forming member and a turning route guide member, in which case an upstream portion of the document might be stuck. In the medium transport apparatus of the fourth aspect, however, even if a route-forming member is deformed by receiving force from a medium, a turning route guide member is also deformed together. This is because lower ends of the teeth of the route-forming member engage with upper ends of the teeth of the turning route guide member, and at least some of the teeth arranged in the width direction are coupled together. This configuration therefore can suppress such reverse steps from being formed, thereby helping to smoothly feed a medium from the route-forming member to the turning route guide member.

According to a fifth aspect of the present disclosure, the medium transport apparatus may have, in addition to the configuration of the fourth aspect, a configuration in which the main body includes a first unit, a second unit, and a third unit. The second unit may be operable or closable by being rotated relative to the first unit and configured to form the first transport route with the first unit when in a closed state. The third unit may be operable or closable by being rotated relative to both the first unit and the second unit and configured to form the second transport route with both the first unit and the second unit when in a closed state. The route-forming member may be disposed inside the first unit. The turning route guide member may be disposed inside the third unit so as to be rotatable relative to the third unit. The route-forming member may be coupled to the turning route guide member via a coupler. The coupler may include a projection and a groove, the projection being formed in one of the route-forming member and the turning route guide member, the groove being formed in the other of the route-forming member and the turning route guide member, the projection being inserted into the groove. When the third unit is opened or closed by being rotated relative to the first unit, the turning route guide member may rotate relative to the third unit, and the projection may slide along the groove.

When a third unit is rotated and opened, some of the couplers that couple a route-forming member to a turning route guide member may be damaged because the route-forming member is disposed inside the first unit, and the turning route guide member is disposed inside the third unit. In the medium transport apparatus of the fifth aspect, however, a coupler includes a projection and a groove. Thus, even when the third unit is rotated relative to both the first unit and the second unit, the turning route guide member rotates relative to the third unit, and the projection slides along the groove. This configuration therefore reduces the risk of the coupler being damaged.

According to a sixth aspect of the present disclosure, the medium transport apparatus may have, in addition to the configuration of the fourth or fifth aspect, a configuration in which, when the first transport route is coupled to the second transport route, a first surface of a medium is guided by an upstream guide member disposed upstream of the route-forming member, then guided by both the route-forming member and the turning route guide member, after which the first surface is guided by a downstream guide member disposed downstream of the turning route guide member, the first surface of the medium being one surface of the medium. The upstream guide member may have a plurality of upstream ribs that extend in the transport direction of the medium and that are arranged in the width direction. The downstream guide member may have a plurality of downstream ribs that extend in the transport direction of the medium and that are arranged in the width direction. In a direction normal to the surface of the medium, the upstream ribs and the downstream ribs may be lower than the teeth of the route-forming member and may also be lower than the teeth of the turning route guide member.

According to a seventh aspect of the present disclosure, the medium transport apparatus may have, in addition to the configuration of one of the second to sixth aspects, a configuration in which, in a direction normal to a surface of a medium being transported along the first transport route, a rotational center of the route-forming member is positioned adjacent to an ejection port with respect to the first transport route, the medium to be ejected from the third transport route via the ejection port.

According to an eighth aspect of the present disclosure, the medium transport apparatus may have, in addition to the configuration of one of the second to seventh aspects, a configuration in which, in a direction normal to a surface of a medium being transported along the first transport route, a rotational center of the switching member may be positioned apart from the first transport route and adjacent to the turning route.

According to a ninth aspect of the present disclosure, a medium transport apparatus includes: a main-body support mounted on an installation surface of the medium transport apparatus; and a main body supported by the main-body support. The main body includes: a first transport route along which a medium is to be transported; a second transport route that includes a turning route by which the medium being transported is to be turned upward and from which the medium that was turned by the turning route is to be ejected, the second transport route being disposed downstream of the first transport route; and a third transport route from which the medium being transported is to be ejected without being turned, the third transport route being disposed downstream of the first transport route. The main body is rotatably attached to the main-body support and is switchable between a first posture and a second posture by being rotated. An angle between the first transport route and the installation surface when the main body is switched to the first posture is greater than the angle between the first transport route and the installation surface when the main body is switched to the second posture. A portion of the body support is a route-forming section that forms an exterior of the turning route. When the main body is switched to the first posture, the route-forming member couples the first transport route to the second transport route. When the main body is switched to the second posture, the route-forming member couples the first transport route to the third transport route.

In a medium transport apparatus of any of the seventh to ninth aspects, a medium transport route to which a first transport route is coupled is switched between a second transport route and a third transport route. This configuration selects an appropriate medium transport route in accordance with the posture of the main body without involving a specific operation of switching the posture of the route-forming member; it is therefore possible to provide improved usability.

According to a tenth aspect of the present disclosure, a medium transport apparatus includes: a main body that is a base component of the medium transport apparatus; and an exposing/hiding unit that is opened to expose or is closed to hide a portion of the main body. The main body includes: a first transport route along which a medium is to be transported; a second transport route that includes a turning route by which the medium being transported is to be turned upward and from which the medium that was turned by the turning route is to be ejected, the second transport route being disposed downstream of the first transport route; a third transport route from which the medium being transported is to be ejected without being turned, the third transport route being disposed downstream of the first transport route; and a transport route switching section that switches a medium transport route to which the first transport route is coupled, between the second transport route and the third transport route. The exposing/hiding unit exposes or hides an ejection port for the medium to be transported along the third transport route. The route-forming member is rotatable and forms an exterior of the turning route. When the exposing/hiding unit is closed, the route-forming member has a first transport route coupling posture by which the first transport route is coupled to the second transport route. When the exposing/hiding unit is opened, the route-forming member has a second transport route coupling posture by which the first transport route is coupled to the third transport route. The transport route switching section has a switching member that engages with both the exposing/hiding unit and the route-forming member, the switching member being a rotatable member. In response to opening or closing of the exposing/hiding unit, engagement of the switching member with the exposing/hiding unit changes to rotate the route-forming member and to switch the medium transport route to which the first transport route is coupled.

Opening an exposing/hiding unit results in the exposure of a third transport route. In a medium transport apparatus of the tenth aspect, the engagement of the switching member with the exposing/hiding unit changes in response to the opening/closing of the exposing/hiding unit, thereby rotating a route-forming member and switching a medium transport route to which a first transport route is coupled. This configuration selects an appropriate medium transport route in accordance with the posture of the main body without involving a specific operation of switching the posture of the route-forming member; it is therefore possible to provide improved usability.

According to an eleventh aspect of the present disclosure, an image reading apparatus includes: one of the medium transport apparatuses of the first to tenth aspects; and a reader that reads a medium, the reader being disposed on the first transport route in the one of the medium transport apparatuses.

The image reading apparatus of the eleventh aspect can produce the effects of the first to tenth aspects.

Some embodiments of the present disclosure will be described below with reference to the accompanying drawings. A scanner 1 is an example of an image reading apparatus configured to read a first surface and/or a second surface of a document. The scanner 1 may be a sheet feed scanner that moves a document (an example of a medium) to a reader and reads it with the reader. The scanner 1 is also an example of a medium transport apparatus configured to transport a document. Herein, the document may be in a sheet, card, booklet, or other form.

The individual drawings employ an X-Y-Z coordinate system: the X-axis extends along the width of the scanner 1 or the width of a document; the Y-axis extends along the depth of the scanner 1; and the Z-axis extends along the height of the scanner 1. In this embodiment, the direction from the rear to front of the scanner 1 is defined as the +Y direction; the direction from the front to rear of the scanner 1 is defined as the −Y direction; the direction from the right to left of the scanner 1 as viewed from the front is defined as the +X direction or the width direction; and the direction from the left to right of the scanner 1 as viewed from the front is defined as the −X direction. Hereinafter, as appropriate, the transport direction of a document is referred to as the downstream direction; the opposite direction is referred to as the upstream direction. In the embodiments described below, the same components are given identical references and thus will not be described again.

Figure 2:
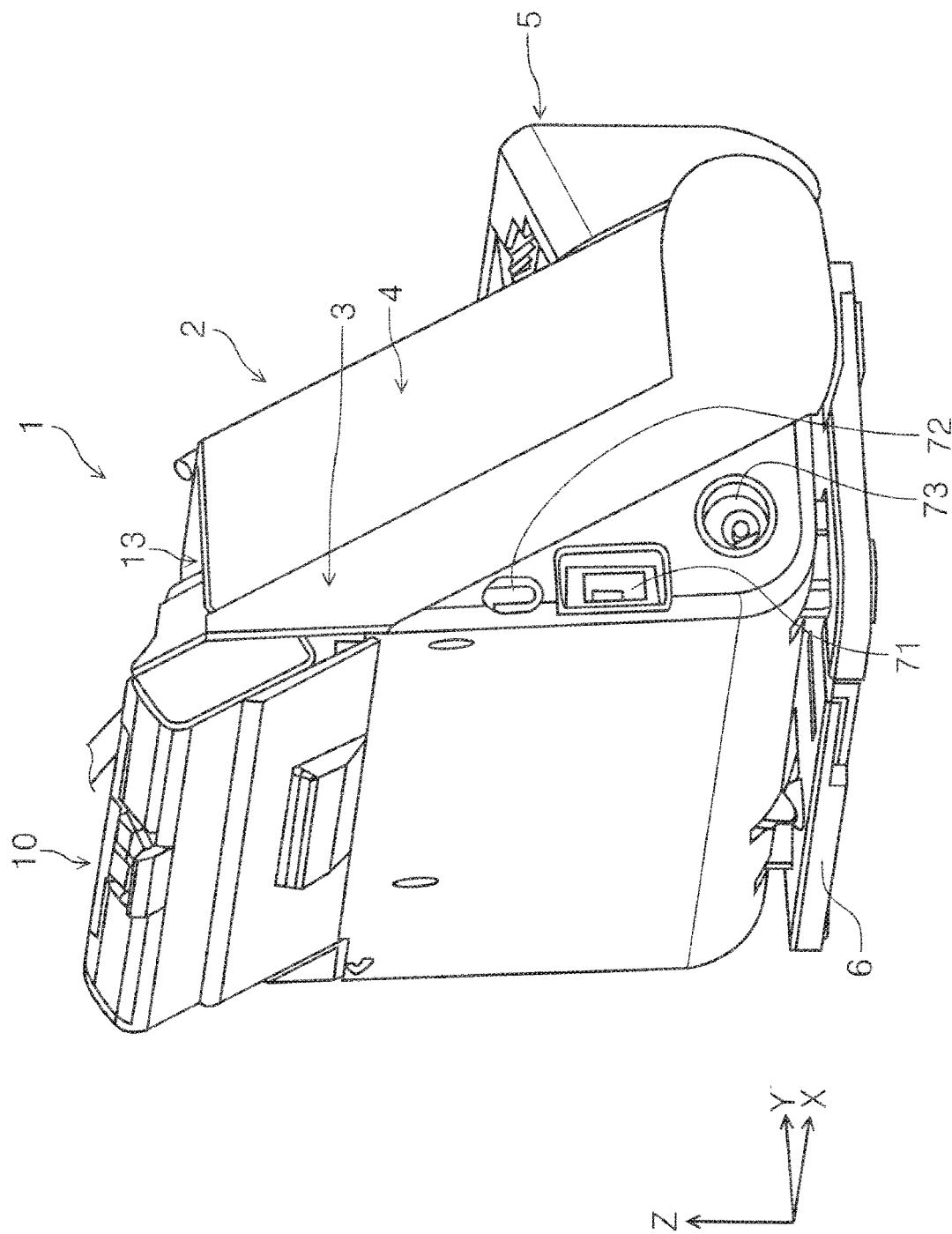
FIG. 2 is a rear perspective view of the scanner with the main body being in the regular reading posture.

As illustrated in FIG. 1 or 2, the scanner 1 includes: a main body 2; and a main-body support 6 that rotatably supports the main body 2. The main body 2 includes a first unit 3, a second unit 4, and a third unit 5.

Figure 3:
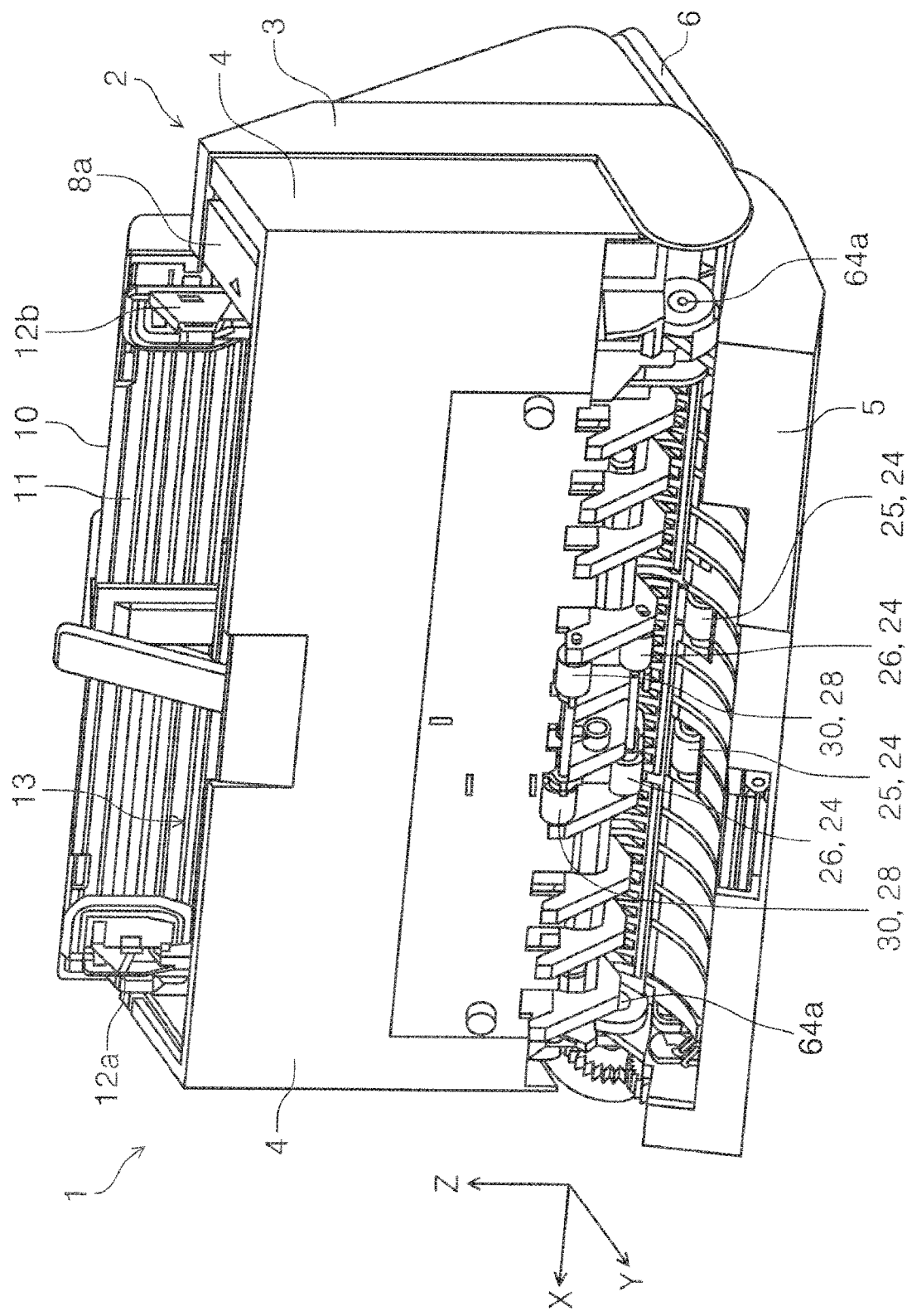
FIG. 3 is a front perspective view of the scanner with a third unit being open and with the main body being in the regular reading posture.
Figure 4:
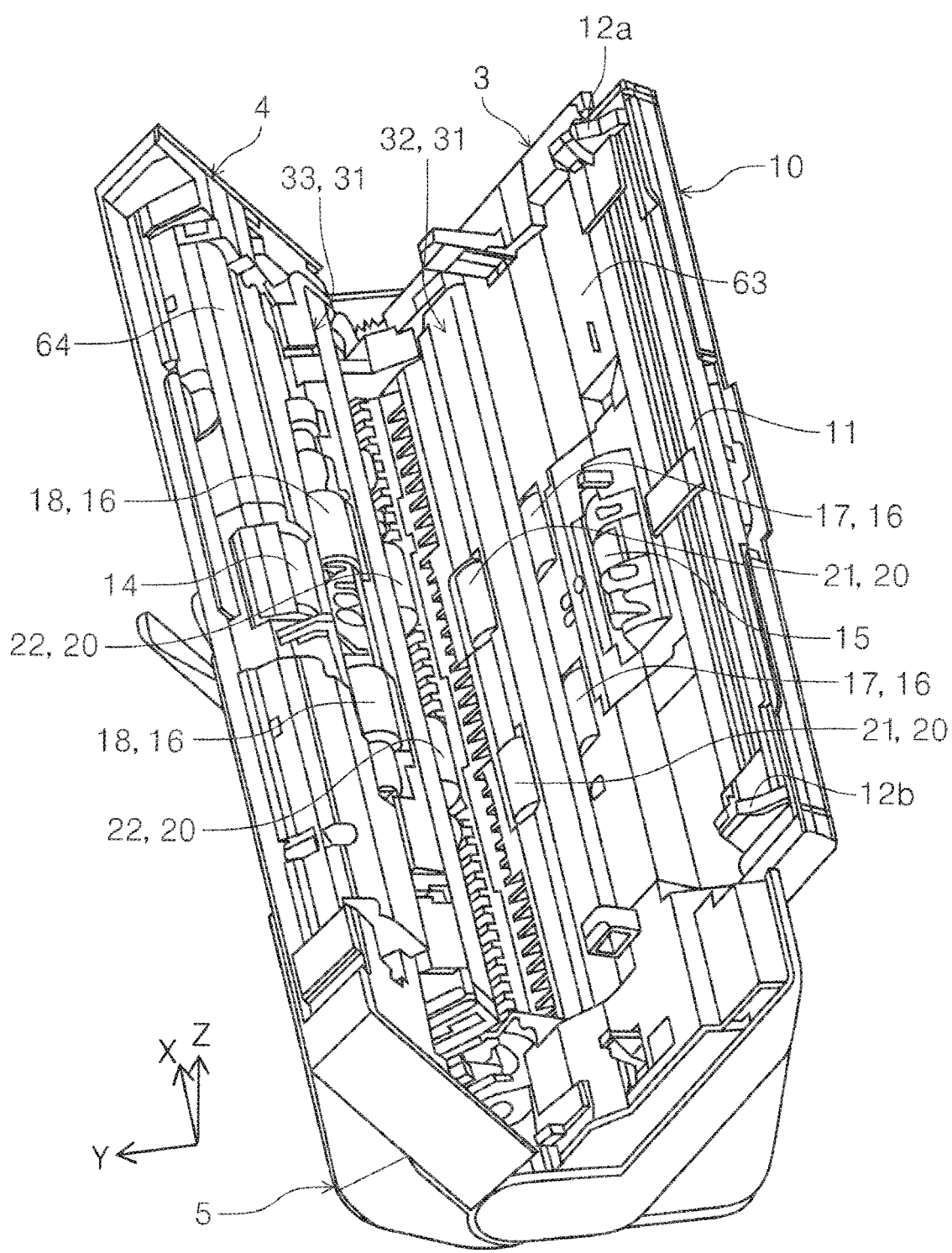
FIG. 4 is a top perspective view of the scanner with a second unit being open and the main body being in the regular reading posture.

Each of the second unit 4 and the third unit 5 is disposed rotatably around a frame rotation shaft 64a (see FIG. 3) disposed at substantially the center of the rotational axis parallel to the X-axis. Both of the second unit 4 and the third unit 5 are thus configured to rotate together around the frame rotation shaft 64a (see FIG. 4) relative to the first unit 3. Reference 8a denotes an unlocking section. By sliding this unlocking section in the −X direction, a user can unlock both the second unit 4 and the third unit 5 that have been fixed to the first unit 3. In addition, by rotating both the second unit 4 and the third unit 5 relative to the first unit 3, the user can partly expose a document transport route, as illustrated in FIG. 4. More specifically, the user can expose a document feeding route R1 and a document reading route R2 (described later) of the document transport route.

The third unit 5 is configured to rotate around the frame rotation shaft 64a (see FIG. 3) relative to both the first unit 3 and the second unit 4. By rotating the third unit 5 relative to both the first unit 3 and the second unit 4, the user can partly expose another portion of the document transport route, as illustrated in FIG. 3. More specifically, the user can expose a turning transport route R3 (described later) of the document transport route.

Figure 5:
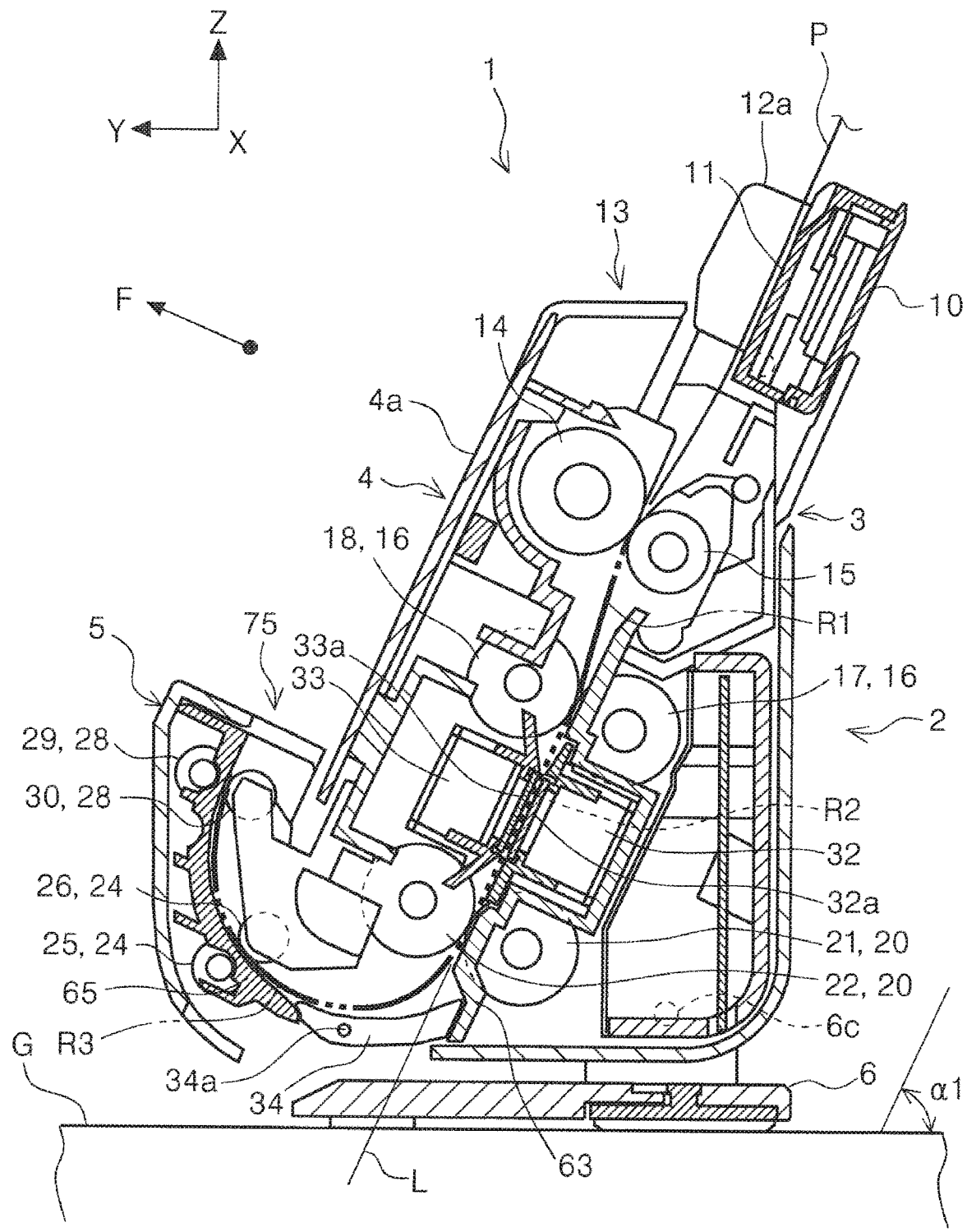
FIG. 5 is a side-sectional view of a document transport route inside the scanner with the main body being in the regular reading posture.
Figure 6:
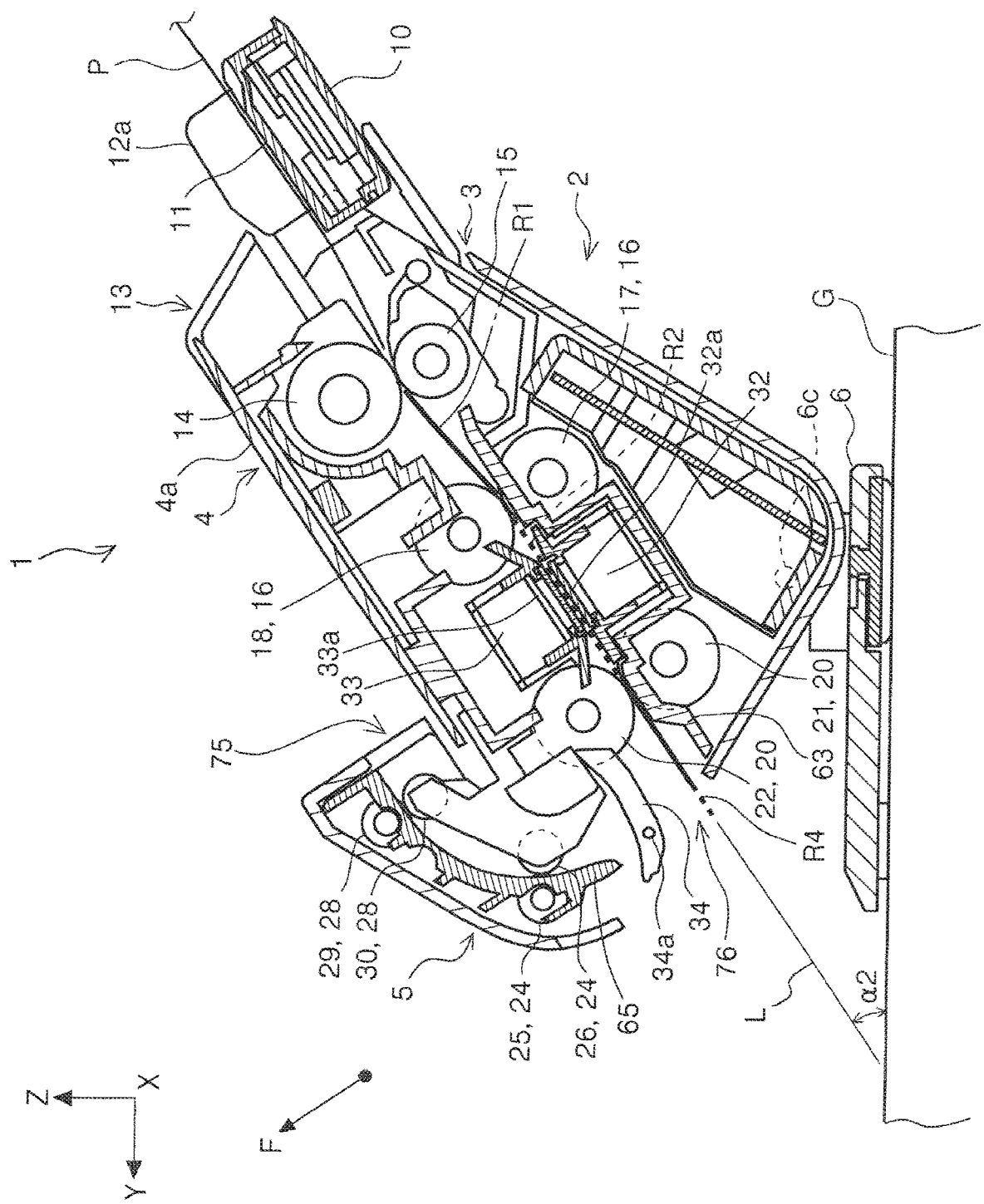
FIG. 6 is a side-sectional view of the document transport route inside the scanner with the main body being in a booklet reading posture.

The main body 2 is configured to rotate relative to the main-body support 6 around a body rotation shaft 6c (see FIGS. 5 and 6). In this embodiment, the main body 2 can be rotated and switched between two postures: a regular reading posture as illustrated in FIG. 5 and a booklet reading posture as illustrated in FIG. 6. The regular reading posture is an example of a first posture, whereas the booklet reading posture is an example of a second posture. As described later, when the main body 2 is switched to the first posture, the document reading route R2 is coupled to the turning transport route R3. When the main body 2 is switched to the second posture, the document reading route R2 is coupled to an unturning transport route R4 (see FIG. 6).

In this embodiment, to switch between the regular reading posture and the booklet reading posture of the main body 2, the user needs to apply external force to the main body 2. The main body 2 can be kept in the regular reading posture or the booklet reading posture by a dedicated snap-fit (not illustrated). In addition, for the purpose of facilitating a user's switching operation, the main body 2 may have a handhold. However, the posture of the main body 2 does not necessarily have to be switched by external force from the user. Alternatively, the posture of the main body 2 may be switched by virtue of the power of a motor.

The angle between the document reading route R2 (described later) and an installation surface G (described later) of the scanner 1 can be switched between an angle α1 as illustrated in FIG. 5 or an angle α2 as illustrated in FIG. 6. The angle α2 formed upon the booklet reading posture is smaller than the angle α1 formed upon the regular reading posture. When the main body 2 is switched to the regular reading posture, the projected area of the main body 2 on the installation surface G, namely, the footprint of the main body 2 becomes smaller. The footprint of the main body 2 discussed herein refers to the area on the X-Y plane occupied by the main body 2 as viewed from the top. The regular reading posture is suitable for reading a soft or thin document, such as a paper sheet, that is likely to be folded or crashed, whereas the booklet reading posture is suitable for reading a hard or thick document, such as a plastic card or a booklet, that is less likely to be folded or crashed.

As can be seen from FIGS. 5 and 6, the angle between a document support 11 and the installation surface G when the main body 2 is switched to the booklet reading posture is smaller than that when it is switched to the regular reading posture. In other words, as can be seen from FIGS. 5 and 6, the angle between the document reading route R2 and the installation surface G when the main body 2 is switched to the booklet reading posture is smaller than that when it is switched to the regular reading posture. In other words, as can be seen from FIGS. 5 and 6, the angle between the installation surface G and the straight line drawn by connecting the locations at which a first transport roller pair 16 (described later) nips a document and at which a second transport roller pair 20 (described later) nips the document when the main body 2 is switched to the booklet reading posture is smaller than that when it is switched to the regular reading posture.

The scanner 1 further includes a front panel having an operating section 7 with a power button and some other operation buttons. As illustrated in FIG. 2, the scanner 1 further includes a first connection 71, a second connection 72, and a third connection 73 on a +X-side surface thereof, which is one of the outer surfaces. The first connection 71 may be a connection port to which a connection target such as a USB Type-A plug (not illustrated) is to be coupled. The second connection 72 may be a connection port to which another connection target such as a USB Type-C plug (not illustrated) is to be coupled. The third connection 73 may be a connection port to which a power plug (not illustrated) via which electric power is supplied to the main body 2 is to be coupled. The USB is an abbreviation for universal serial bus, and Type-A and Type-C are types specified in the USB standard.

Via the first connection 71, the main body 2 may be coupled to an external apparatus or a storage medium such as a USB memory by a USB cable (not illustrated). In addition, a controller (not illustrated) may store read data in the storage medium coupled to the main body 2 via the first connection 71. Via the second connection 72, the main body 2 may be coupled to an external apparatus by a USB cable (not illustrated). All of the first connection 71, the second connection 72, and the third connection 73 may be mounted on a circuit board (not illustrated) disposed adjacent to the rear of the scanner 1. In this embodiment, via the second connection 72, the main body 2 may be supplied with electric power from an external apparatus.

With reference to FIGS. 5 and 6, a configuration of the document transport route inside the scanner 1 will be described below. The document support 11 supports a document P in an inclined posture before the document P is transported along the document transport route. When the document support 11 supports a plurality of documents P thereon, the feed roller 14 feeds only the uppermost one in the downstream direction. The document support 11 is disposed in an upper opening/closing section 10, which is configured to rotate around a rotation shaft (not illustrated) to hide or expose a supply port 13. In FIG. 1, the upper opening/closing section 10 is closed; in FIG. 2, the upper opening/closing section 10 is open. The upper opening/closing section 10 may be a component of the first unit 3.

As illustrated in FIG. 3, the document support 11 has a pair of edge guides 12a and 12b that guide both sides of the document P. Each of the edge guides 12a and 12b is disposed slidably along the width of the document P, or in the ±X directions. The edge guides 12a and 12b are interlocked by a rack and pinon mechanism (not illustrated) so that they can move toward or away from each other relative to the center of the document P in the width direction of the document P. In short, the scanner 1 employs the center feed system.

As illustrated in FIGS. 5 and 6, the scanner 1 further includes a feed roller 14 inside the second unit 4. The feed roller 14 rotates by virtue of the power of a motor (not illustrated). The scanner 1 further includes a separation roller 15 opposite the feed roller 14 inside the first unit 3. The separation roller 15 receives rotation torque from a torque limiter (not illustrated) to suppress multi-feeding of documents. As illustrated in FIG. 4, the feed roller 14 is disposed at substantially the center of the second unit 4 in the width direction of a document P; likewise, the separation roller 15 is disposed at substantially the center of the first unit 3 in the with direction of the document P. In this case, the separation roller 15 is optional; alternatively, a separation pad may be disposed. In this embodiment, when a plurality of documents P are stacked on the document support 11, the feed roller 14 is positioned above the documents P and sequentially feeds them from the uppermost one. This configuration, however, is optional; alternatively, the feed roller 14 is disposed below the documents P stacked on the document support 11 and sequentially feeds them from the lowermost one.

The separation roller 15 can be coupled to the torque limiter via a gear (not illustrated). This gear is displaced by a solenoid (not illustrated) so that the separation roller 15 can switch between two states: a separation state where the separation roller 15 is coupled to the torque limiter and separates a plurality of documents P from one another; and a non-separation state where the separation roller 15 is decoupled from the torque limiter and does not separate the documents P. The solenoid is controlled by the controller (not illustrated) in such a way that the separation roller 15 enters the separation state when the main body 2 is switched to the regular reading posture and, in turn, enters the non-separation state when the main body 2 is switched to the booklet reading posture.

The first transport roller pair 16 is disposed downstream of both the feed roller 14 and the separation roller 15. The first transport roller pair 16 includes: a pair of first lower rollers 17 disposed inside the first unit 3; and a pair of first upper rollers 18 disposed inside the second unit 4. The first upper rollers 18 are movable toward or away from the corresponding first lower rollers 17 and are pressed against the first lower rollers 17 by a pushing member such as a coil spring. The first lower rollers 17 and the first upper rollers 18 rotate by virtue of the power of one or more motors (not illustrated). As illustrated in FIG. 4, the first lower rollers 17 are arranged symmetrically with respect to the center of the first unit 3 in the width direction of the document P; likewise, the first upper rollers 18 are arranged symmetrically with respect to the center of the second unit 4 in the width direction of the document P. By closing the second unit 4, the first upper rollers 18 comes into contact with the corresponding first lower rollers 17. By opening the second unit 4, the first upper rollers 18 become separated from the corresponding first lower rollers 17.

A first reader 32 and a second reader 33 are disposed downstream of the first transport roller pair 16 so as to face each other. The first reader 32 is disposed inside the first unit 3, whereas the second reader 33 is disposed inside the second unit 4. The first reader 32 reads a lower surface (first surface) of the document P supported by the document support 11, whereas the second reader 33 reads an upper surface (second surface) of the document P supported by the document support 11. The second reader 33 is movable toward or away from the first reader 32 and is pressed against the first reader 32 by a pushing member (not illustrated) such as a coil spring. In this embodiment, each of the first reader 32 and the second reader 33 may be a contact image sensor module (CISM). Reference 32a denotes a contact glass of the first reader 32; reference 33a denotes a contact glass of the second reader 33.

The second transport roller pair 20 is disposed downstream of both the first reader 32 and the second reader 33. The second transport roller pair 20 includes: a pair of second lower rollers 21 disposed inside the first unit 3; and a pair of second upper rollers 22 disposed inside the second unit 4. The second upper rollers 22 are movable toward or away from the corresponding second lower rollers 21 and are pressed against the second lower rollers 21 by a pushing member (not illustrated) such as a coil spring. The second lower rollers 21 and the second upper rollers 22 rotate by virtue of the power of one or more motors (not illustrated). As illustrated in FIG. 4, the second lower rollers 21 are arranged symmetrically with respect to substantially the center of the first unit 3 in the width direction of the document P; likewise, the second upper rollers 22 are arranged symmetrically with respect to substantially the center of the second unit 4 in the width direction of the document P. By closing the second unit 4, the second lower rollers 21 comes into contact with the corresponding second upper rollers 22. By opening the second unit 4, the second upper rollers 22 becomes separated from the corresponding second lower rollers 21.

In FIGS. 5 and 6, the alternate long and short dash line denoted by R1 indicates the document feeding route, which extends from the nip location between the feed roller 14 and the separation roller 15 to the nip location of the first transport roller pair 16. In FIGS. 5 and 6, the broken line denoted by R2 indicates the document reading route, which extends from the nip location of the first transport roller pair 16 to the nip location of the second transport roller pair 20. The document reading route R2, which is an example of a first transport route, is formed between the first reader 32 and the second reader 33.

When the main body 2 is switched to the regular reading posture, as illustrated in FIG. 5, the turning transport route R3, by which a read document P is to be turned upward and from which it is ejected to the outside, is formed downstream of the document reading route R2. The turning transport route R3 extends from the nip location of the second transport roller pair 20 to the nip location of a fourth transport roller pair 28. The turning transport route R3 is a document transport route by which the document that has been transported obliquely downward is to be turned upward and from which it is ejected obliquely upward to the outside via a first ejection port 75, as indicated by the alternate long and two short dashes line in FIG. 5. The turning transport route R3 is an example of a second transport route. In this embodiment, the turning transport route R3 has a turning route by which an entire document P being transported is turned upward. The turning transport route R3, however, may include a straight transport route in addition to this turning route. After having been ejected obliquely upward from the turning transport route R3 to the outside via the first ejection port 75, the document is supported in an inclined posture by a +Y-side surface 4a of the second unit 4.

When the main body 2 is switched to the booklet reading posture, as illustrated in FIG. 6, the unturning transport route R4, from which a read document is to be ejected to the outside without being turned, is formed downstream of the document reading route R2. The unturning transport route R4 is a document transport route formed downstream of the nip location of the second transport roller pair 20. In addition, the unturning transport route R4 is also a document transport route from which a document that has been transported obliquely downward is to be ejected obliquely downward to the outside via a second ejection port 76 without being turned, as indicated by the alternate long and two short dashes line in FIG. 6. The unturning transport route R4 is an example of a third transport route from which a document being transported is to be ejected to the outside without being turned. The second transport roller pair 20 serves as an ejection roller that ejects a document that has been transported along the unturning transport route R4 to the outside.

A third transport roller pair 24 and the fourth transport roller pair 28 are disposed on the turning transport route R3. The third transport roller pair 24 includes: a pair of third drive rollers 25 disposed inside the third unit 5; and a pair of third driven rollers 26 disposed inside the second unit 4. The third driven rollers 26 are movable toward or away from the corresponding third drive rollers 25 and are pressed against the third drive rollers 25 by a pushing member (not illustrated) such as a coil spring. The third drive rollers 25 may be driven by a motor (not illustrated), whereas each third driven roller 26 may be a driven rotating roller.

The fourth transport roller pair 28 includes: a pair of fourth drive rollers 29 disposed inside the third unit 5; and a pair of fourth driven rollers 30 disposed inside the second unit 4. The fourth driven rollers 30 are movable toward or away from the corresponding fourth drive rollers 29 and are pressed against the fourth drive rollers 29 by a pushing member (not illustrated) such as a coil spring. The fourth drive rollers 29 may be driven by a motor (not illustrated), whereas each fourth driven roller 30 may be a driven rotating roller.

First Embodiment

With reference to FIGS. 5 to 10, a first embodiment of the present disclosure will be described below regarding a configuration of selectively coupling the document reading route R2 to either the turning transport route R3 or the unturning transport route R4. First, an outline of the configuration in the first embodiment will be described below. The turning transport route R3 has an exterior formed by a flap 34, which is rotatable. When the main body 2 is switched to the regular reading posture, the flap 34 has a first transport route coupling posture (FIGS. 5, 7, and 9) by which the document reading route R2 is coupled to the turning transport route R3. When the main body 2 is switched to the booklet reading posture, the flap 34 has a second transport route coupling posture (FIGS. 6 and 8) by which the document reading route R2 is coupled to the unturning transport route R4. The posture of the flap 34 is switched by a transport route switching section 40A. The transport route switching section 40A includes a switching member 41, which is a rotatable member configured to engage both the main-body support 6 and the flap 34. In response to the switching of the posture of the main body 2, the engagement of the switching member 41 with the main-body support 6 changes, thereby rotating the flap 35 to switch between the transport route to which the document reading route R2 is coupled. This configuration selects an appropriate transport route in accordance with the posture of the main body 2 without involving a specific operation of switching the posture of the flap 34; it is therefore possible to provide improved usability.

The transport route switching section 40A includes a first spring 45 and a second spring 46. The first spring 45 pushes the flap 34 so as to have the first transport route coupling posture, whereas the second spring 46 pushes the switching member 41 in the direction in which the switching member 41 pushes the flap 34 so as to have the second transport route coupling posture. The first spring 45 is an example of a first pushing member, whereas the second spring 46 is an example of a second pushing member. The pushing force of the second spring 46 is greater than that of the first spring 45. When the main body 2 is switched to the regular reading posture, the switching member 41 abuts against the main-body support 6 and does not push the flap 34. As a result, the flap 34 receives the pushing force of the first spring 45 and has the first transport route coupling posture. When the main body 2 is switched to the booklet reading posture, the switching member 41 moves away from the main-body support 6 and pushes the flap 34 against the pushing force of the first spring 45. As a result, the flap 34 has the second transport route coupling posture.

Next, details of the above configuration will be described below. As illustrated in FIGS. 5 and 6, the flap 34 is rotatable around a flap rotation shaft 34a. The flap 34 can rotate to switch between the first transport route coupling posture (see FIG. 5) by which the document reading route R2 is coupled to the turning transport route R3 and the second transport route coupling posture (FIG. 6) by which the document reading route R2 is coupled to the unturning transport route R4. When in the first transport route coupling posture, the flap 34 partly covers the unturning transport route R4 as viewed from the +X or −X direction. The expression "the document reading route R2 is coupled to the turning transport route R3" herein means that the turning transport route R3 is switched to a usable state, and the unturning transport route R4 is covered and thus switched to an unusable state. The expression "the document reading route R2 is coupled to the unturning transport route R4" herein means that the unturning transport route R4 is switched to a usable state, and the turning transport route R3 is covered and thus switched to an unusable state.

Figure 10:
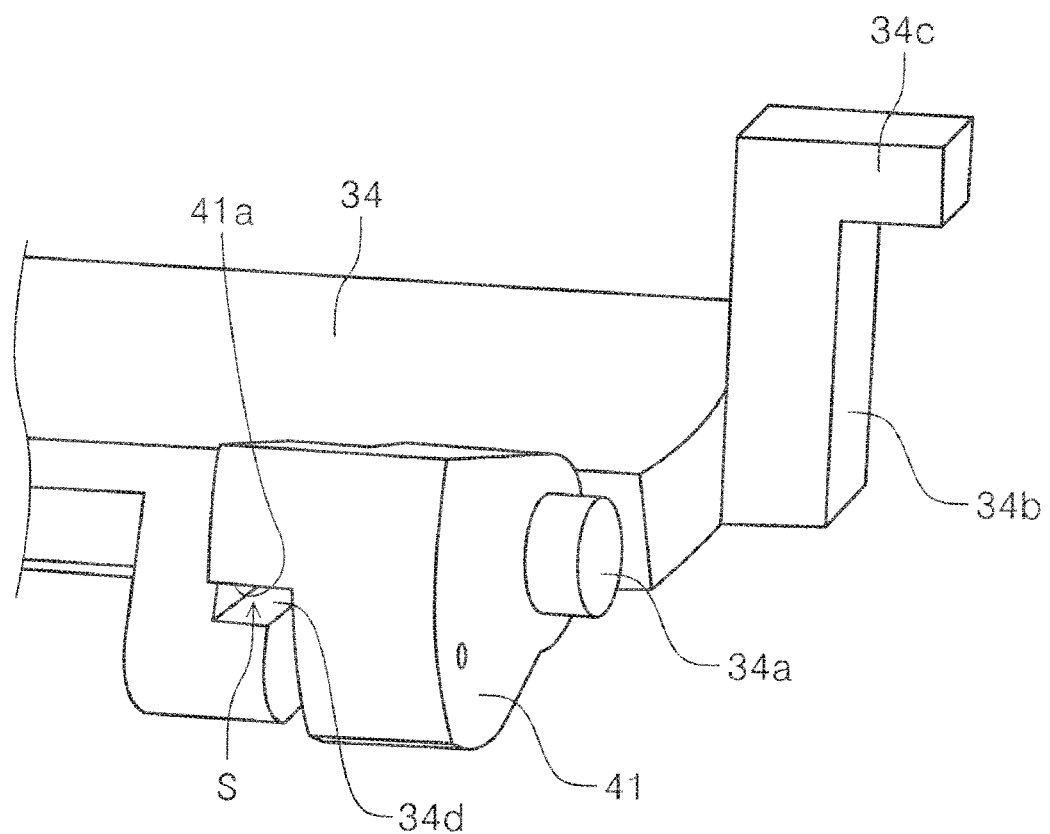
FIG. 10 is a perspective view of the flap and the switching member.

As illustrated in FIG. 10, the switching member 41 is disposed on the −X-side of the flap 34 so as to be rotatable around the flap rotation shaft 34a. The switching member 41 rotates clockwise on the page of FIG. 7 or 8 so that a pushing surface 41a (FIG. 10) can push a pushed surface 34d of the flap 34. In the state of FIG. 10, a space S is present between the pushing surface 41a and the pushed surface 34d, and the pushing surface 41a does not push the pushed surface 34d. When the space S disappears, the pushing surface 41a starts pushing the pushed surface 34d. The direction in which the pushing surface 41a pushes the pushed surface 34d coincides with the direction in which the flap 34 moves to have the second transport route coupling posture (i.e., the counterclockwise direction on the page of FIG. 7 or 8).

Figure 7:
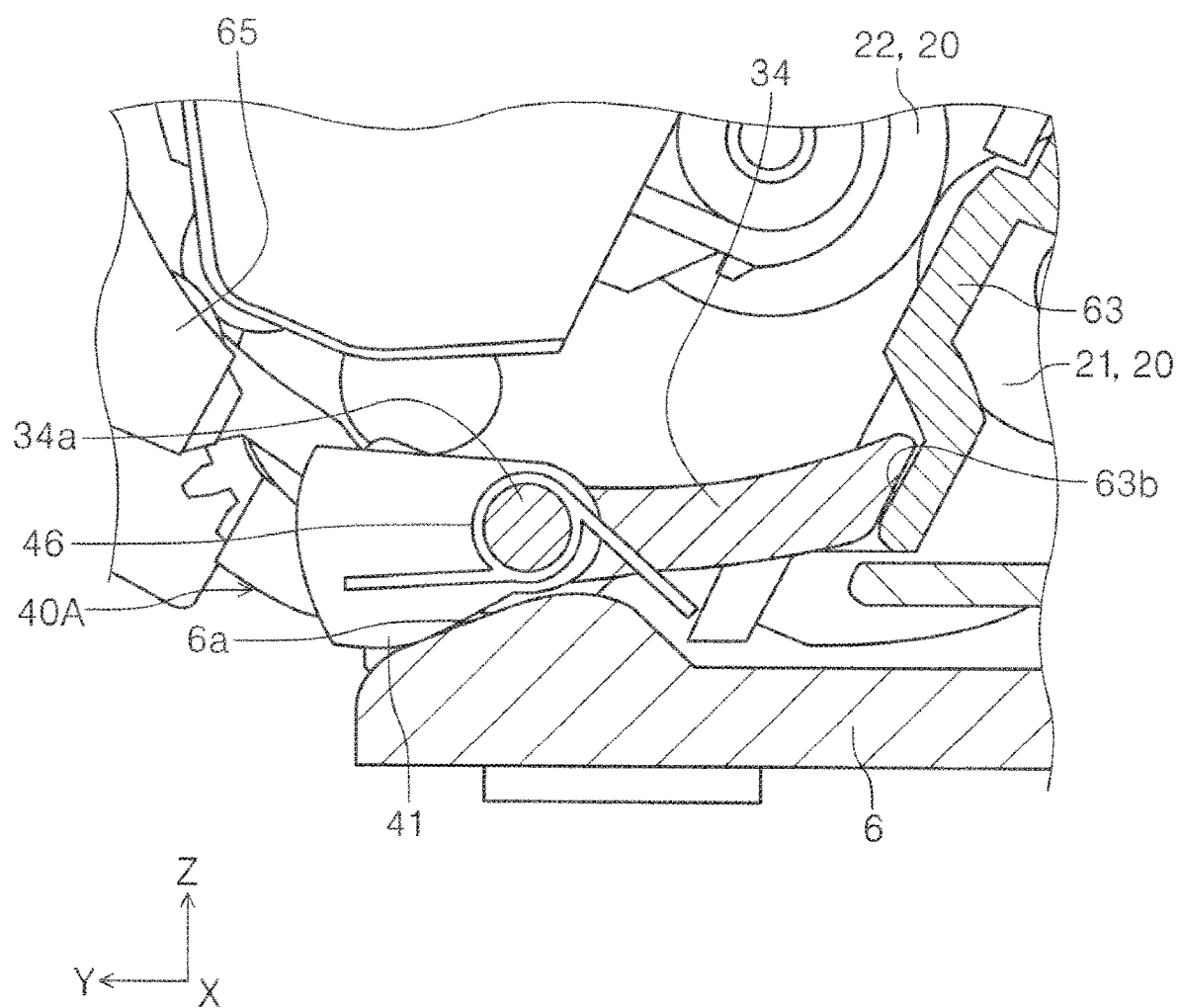
FIG. 7 is a side-sectional view of a transport route switching section inside the scanner with the flap having a first transport route coupling posture.
Figure 8:
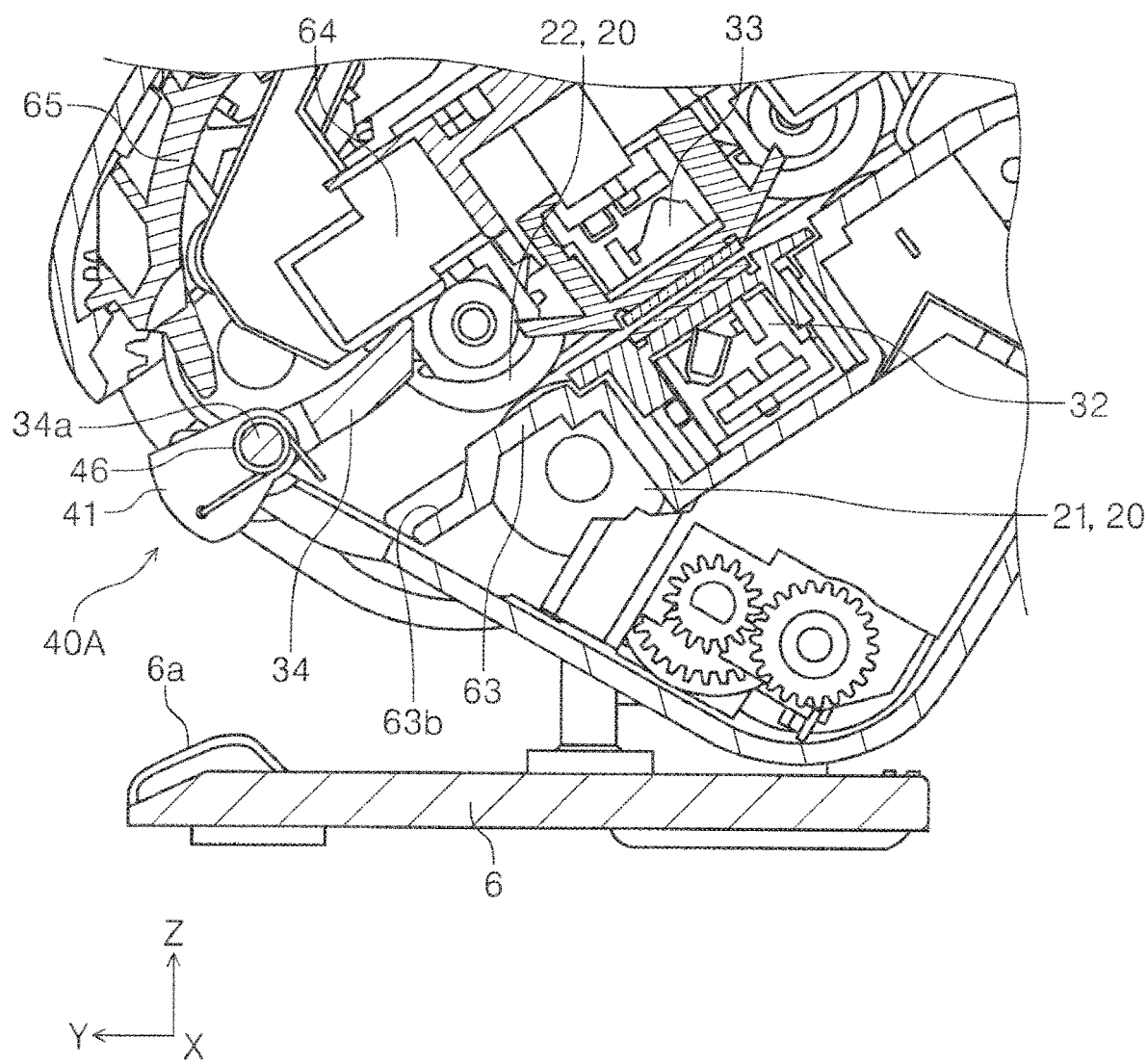
FIG. 8 is a side-sectional view of the transport route switching section inside the scanner with the flap having a second transport route coupling posture.

The second spring 46, which may be a torsion spring in this embodiment, is disposed around the flap rotation shaft 34a and pushes the switching member 41 in the counterclockwise direction on the page of FIG. 7 or 8. Of the second spring 46, a first end is attached to the switching member 41, and a second end is attached to a spring fixture (not illustrated) of the first unit 3.

Figure 9:
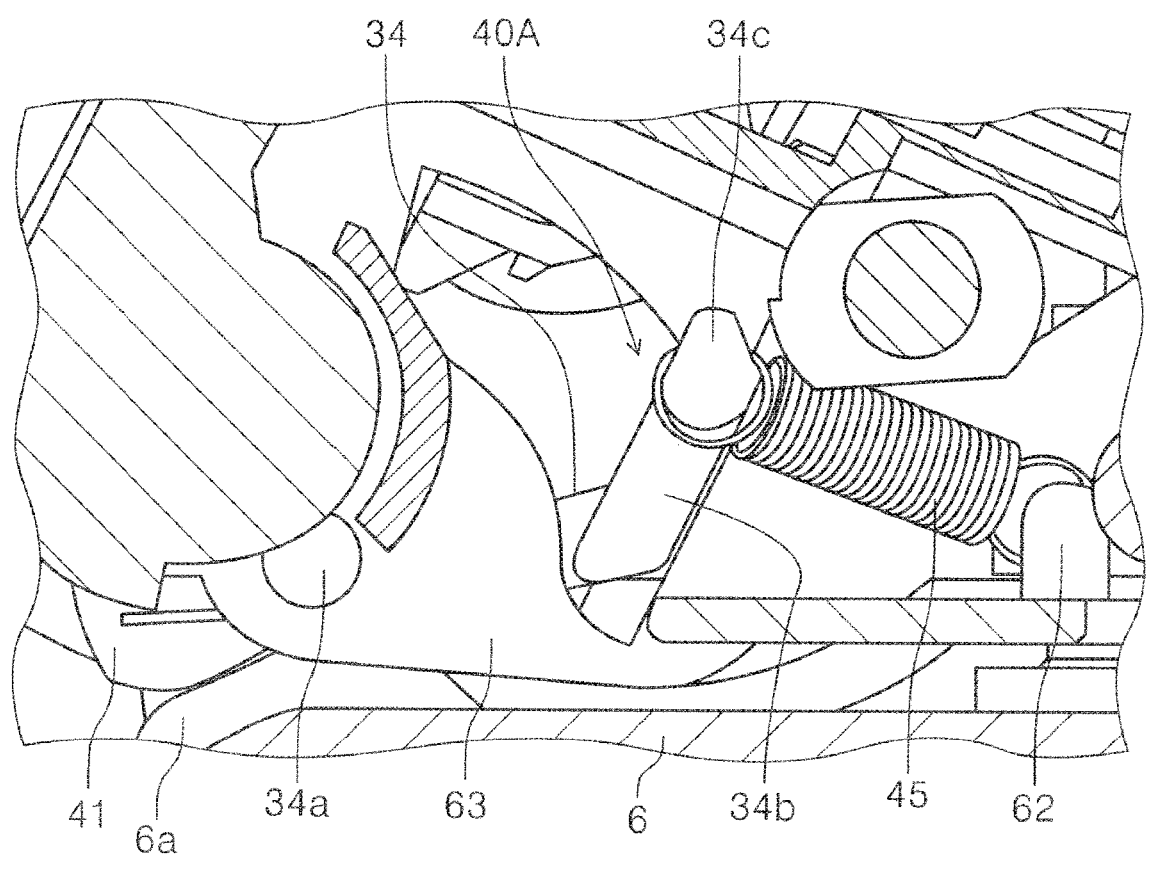
FIG. 9 is another side-sectional view of the transport route switching section inside the scanner with the flap having the first transport route coupling posture.

The −X-side of the flap 34 is provided with an arm 34b, the upper portion of which has a spring fixture 34c. As illustrated in FIG. 9, the first unit 3 has a spring fixture 62. The first spring 45 is disposed between the spring fixture 62 and the spring fixture 34c of the flap 34. In this embodiment, the first spring 45 may be a helical extension spring. The first spring 45 pushes the flap 34 (in the clockwise direction on the page of FIG. 9) so as to have the first transport route coupling posture.

In the state of FIG. 7, namely, in the state where the main body 2 is in the regular reading posture, the switching member 41 abuts against an abutment 6a of the main-body support 6, thereby suppressing the switching member 41 from rotating counterclockwise against the pushing force of the second spring 46. In this case, the space S is present between the pushing surface 41a and the pushed surface 34d as illustrated in FIG. 10, and the switching member 41 does not push the flap 34. As a result, the flap 34 receives the pushing force of the first spring 45 and abuts against a limiter 63b of a first frame 63. In this way, the flap 34 has the first transport route coupling posture. It should be noted that the space S does not necessarily have to be present between the pushing surface 41a and the pushed surface 34d when the main body 2 has the regular reading posture.

When the main body 2 that has been in the state of FIG. 7 is rotated and switched to the booklet reading posture, the switching member 41 moves away from the abutment 6a. As a result, the switching member 41 receives the pushing force of the second spring 46 in the counterclockwise direction on the page of FIG. 8. The pushing force applied counterclockwise by the second spring 46 to the switching member 41 is greater than that applied clockwise by the first spring 45 to the flap 34. In short, when the main body 2 that has been in the state of FIG. 7 is rotated and switched to the booklet reading posture, the switching member 41 pushes the flap 34 counterclockwise against the pushing force of the first spring 45, as can be seen from the difference in state between FIGS. 7 and 8. In this way, the flap 34 has the second transport route coupling posture. The second transport route coupling posture of the flap 34 is controlled by the abutting of the flap 34 on a second frame 64, which is a base component of the second unit 4.

When the main body 2 is switched from the booklet reading posture (see FIG. 8) to the regular reading posture (see FIG. 7), the switching member 41 abuts against the abutment 6a and rotates clockwise. The switching member 41 then stops pushing the flap 34 and has the first transport route coupling posture (see FIG. 7).

Second Embodiment

With reference to FIGS. 11 to 22, a second embodiment of the present disclosure will be described below regarding a configuration of selectively coupling a document reading route R2 to either a turning transport route R3 or an unturning transport route R4. First, an outline of the configuration in the second embodiment will be described below. A turning transport route R3 has an exterior formed by a flap 35, which is rotatable. When a main body 2 is switched to a regular reading posture, the flap 35 has a first transport route coupling posture (FIGS. 13, 14, 16, 19, and 20) by which the document reading route R2 is coupled to the turning transport route R3. When the main body 2 is switched to a booklet reading posture, the flap 35 has a second transport route coupling posture (FIGS. 17, 18, 21, and 22) by which the document reading route R2 is coupled to the unturning transport route R4. The posture of the flap 35 is switched by a transport route switching section 40B. The transport route switching section 40B includes a switching member 47, which is a rotatable member configured to engage both a main-body support 6A and the flap 35. In response to the switching of the posture of the main body 2, the engagement of the switching member 47 with the main-body support 6A changes, thereby rotating the flap 35 to switch the document transport route to which the document reading route R2 is coupled. This configuration selects an appropriate transport route in accordance with the posture of the main body 2 without involving a specific operation of switching the posture of the flap 35; it is therefore possible to provide improved usability.

Next, details of the above configuration will be given below. The flap 35 is disposed so as to be rotatable around a flap rotation shaft 35a (see FIG. 12) relative to the first frame 63. The flap 35 can rotate to switch between the first transport route coupling posture (see FIG. 20) by which the document reading route R2 is coupled to the turning transport route R3 and the second transport route coupling posture (FIG. 22) by which the document reading route R2 is coupled to the unturning transport route R4.

Figure 19:
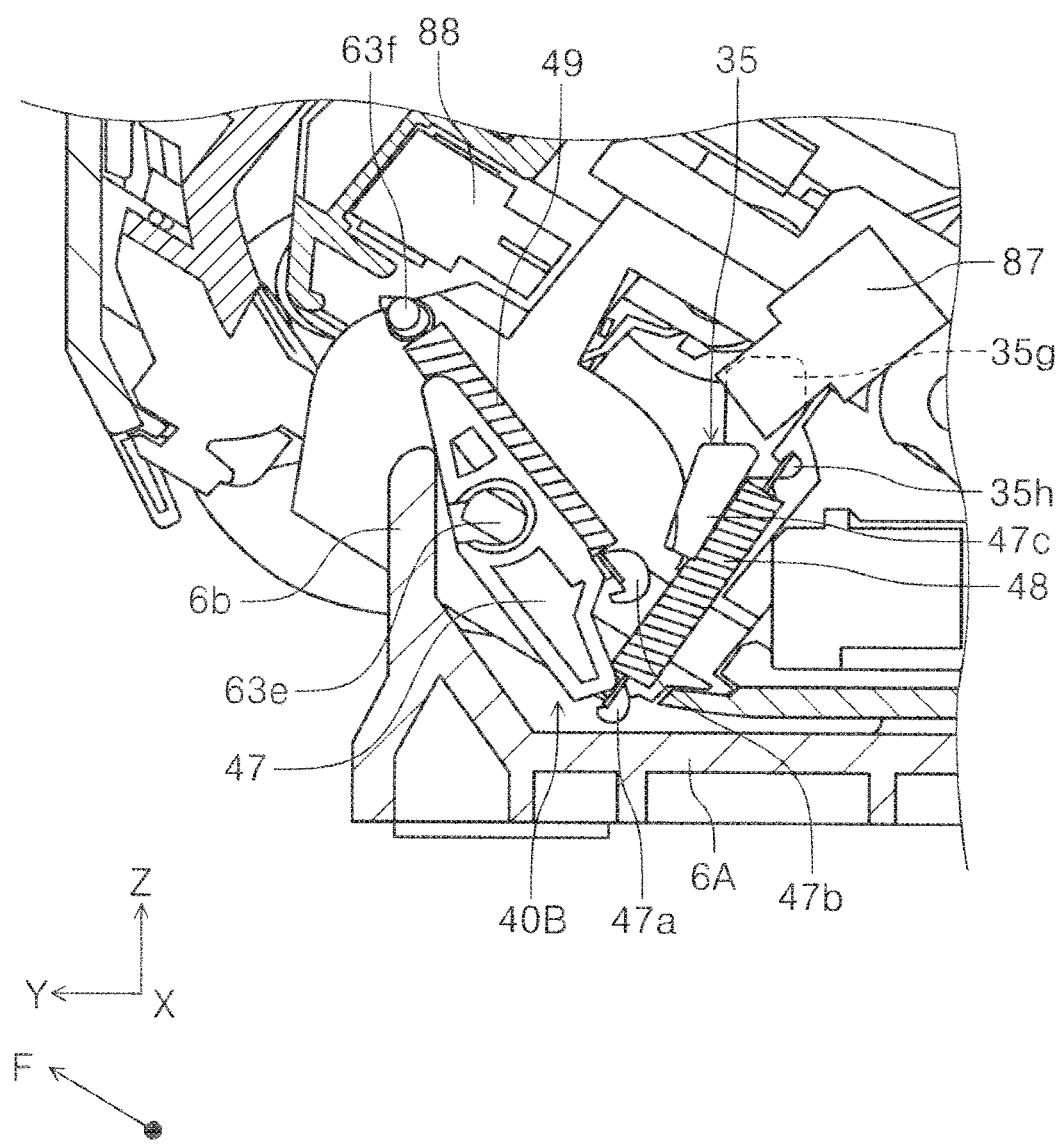
FIG. 19 is a side view of the transport route switching section with the flap having the first transport route coupling posture.
Figure 21:
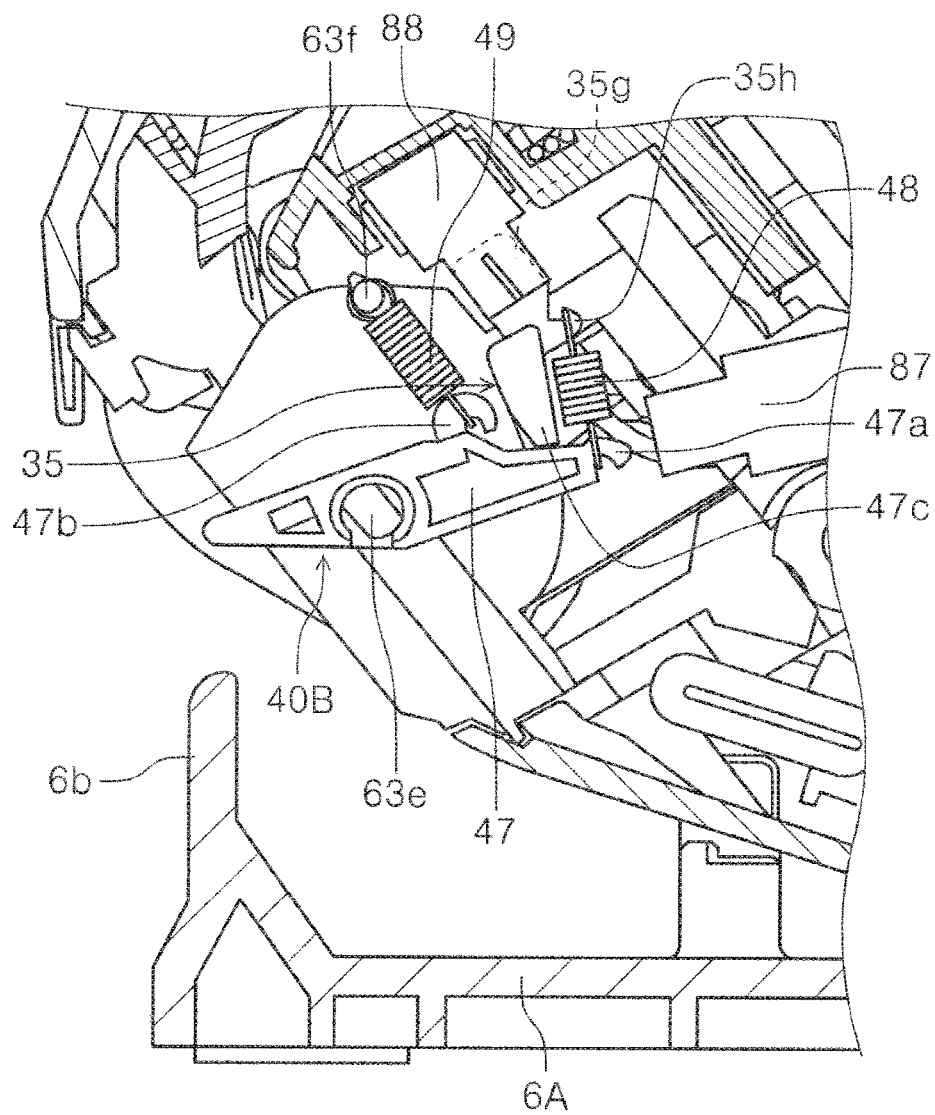
FIG. 21 is a side view of the transport route switching section with the flap having the second transport route coupling posture.

The transport route switching section 40B is configured to rotate the flap 35 in response to the rotation of the main body 2. As illustrated in FIGS. 19 and 21, the transport route switching section 40B includes the switching member 47, a first spring 48, and a second spring 49. The first spring 48 pushes the flap 35 so as to have the first transport route coupling posture. The second spring 49 pushes the switching member 47 in the direction in which the switching member 47 pushes the flap 35 so as to have the second transport route coupling posture. The first spring 48 is an example of the first pushing member, whereas the second spring 49 is an example of the second pushing member.

The switching member 47 is disposed on the −X-side of the main body 2 so as to be rotatable around a rotation shaft 63e (see FIGS. 19 and 21). The first spring 48 is attached to both a first spring fixture 47a of the switching member 47 and a spring fixture 35h of the flap 35. In this embodiment, the first spring 48 may be a helical extension spring. The second spring 49 is attached to both a second spring fixture 47b of the switching member 47 and a spring fixture 63f of the first frame 63. In this embodiment, the second spring 49 may also be a helical extension spring.

Figure 20:
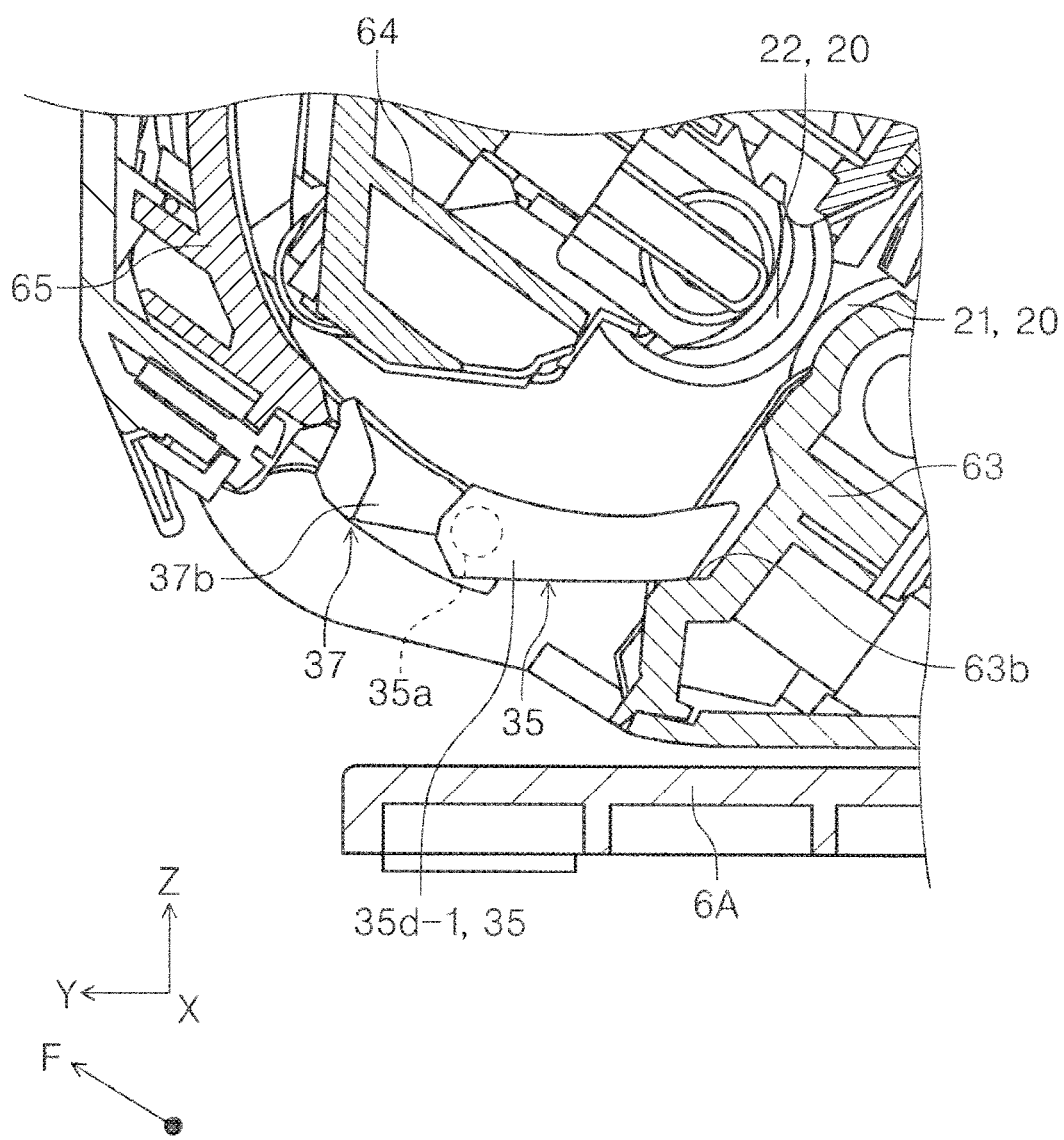
FIG. 20 is a perspective view of the flap having the first transport route coupling posture and the turning route guide member.

When the main body 2 is switched to the regular reading posture, as illustrated in FIG. 19, the switching member 47 abuts against an abutment 6b of the main-body support 6A, thereby being suppressed from rotating counterclockwise by virtue of the pushing force of the second spring 49. As a result, the first spring 48 applies its pushing force to the flap 35 clockwise so that the flap 35 has the first transport route coupling posture as illustrated in FIG. 20. In this case, the clockwise rotation of the flap 35 is suppressed by a limiter 63b formed on the first frame 63, as illustrated in FIG. 20.

When the main body 2 that has been in the state of FIG. 21 is rotated and switched to the booklet reading posture, the switching member 47 moves away from the abutment 6b and rotates counterclockwise by virtue of the pushing force of the second spring 49. In this case, as illustrated in FIG. 21, the switching member 47 pushes a pushed section 47c of the flap 35, thereby rotating the flap 35 counterclockwise to have the second transport route coupling posture. The second transport route coupling posture of the flap 35 is controlled by the abutting of the flap 35 on a second frame 64.

When the main body 2 is rotated and switched from the booklet reading posture to the regular reading posture, the switching member 47 abuts against the abutment 6b and then rotates clockwise. As a result, the first spring 48 is expanded to apply its pushing force to the flap 35 so that the flap 35 has the first transport route coupling posture.

In FIGS. 19 and 21, reference 87 denotes a first posture detection sensor, and reference 88 denotes a second posture detection sensor. In this embodiment, each of the first posture detection sensor 87 and the second posture detection sensor 88 may be an optical sensor that includes a light emitter (not illustrated) and a light receiver (not illustrated). Each of the first posture detection sensor 87 and the second posture detection sensor 88 is configured to detect a detected section 35g of the flap 35. More specifically, when the main body 2 is switched to the regular reading posture with the flap 35 having the first transport route coupling posture, as illustrated in FIG. 19, the detected section 35g enters the optical path of the first posture detection sensor 87. In response, the controller (not illustrated) determines that the flap 35 has the first transport route coupling posture. When the main body 2 is switched to the booklet reading posture with the flap 35 having the second transport route coupling posture, as illustrated in FIG. 21, the detected section 35g enters the optical path of the second posture detection sensor 88. In response, the controller (not illustrated) determines that the flap 35 has the second transport route coupling posture. This configuration can suppress the main body 2 from transporting a document when the flap 35 has an improper posture, which may be any posture other than the first transport route coupling posture and the second transport route coupling posture. It is consequently possible to reduce the risk of the document stuck inside the main body 2.

Figure 11:
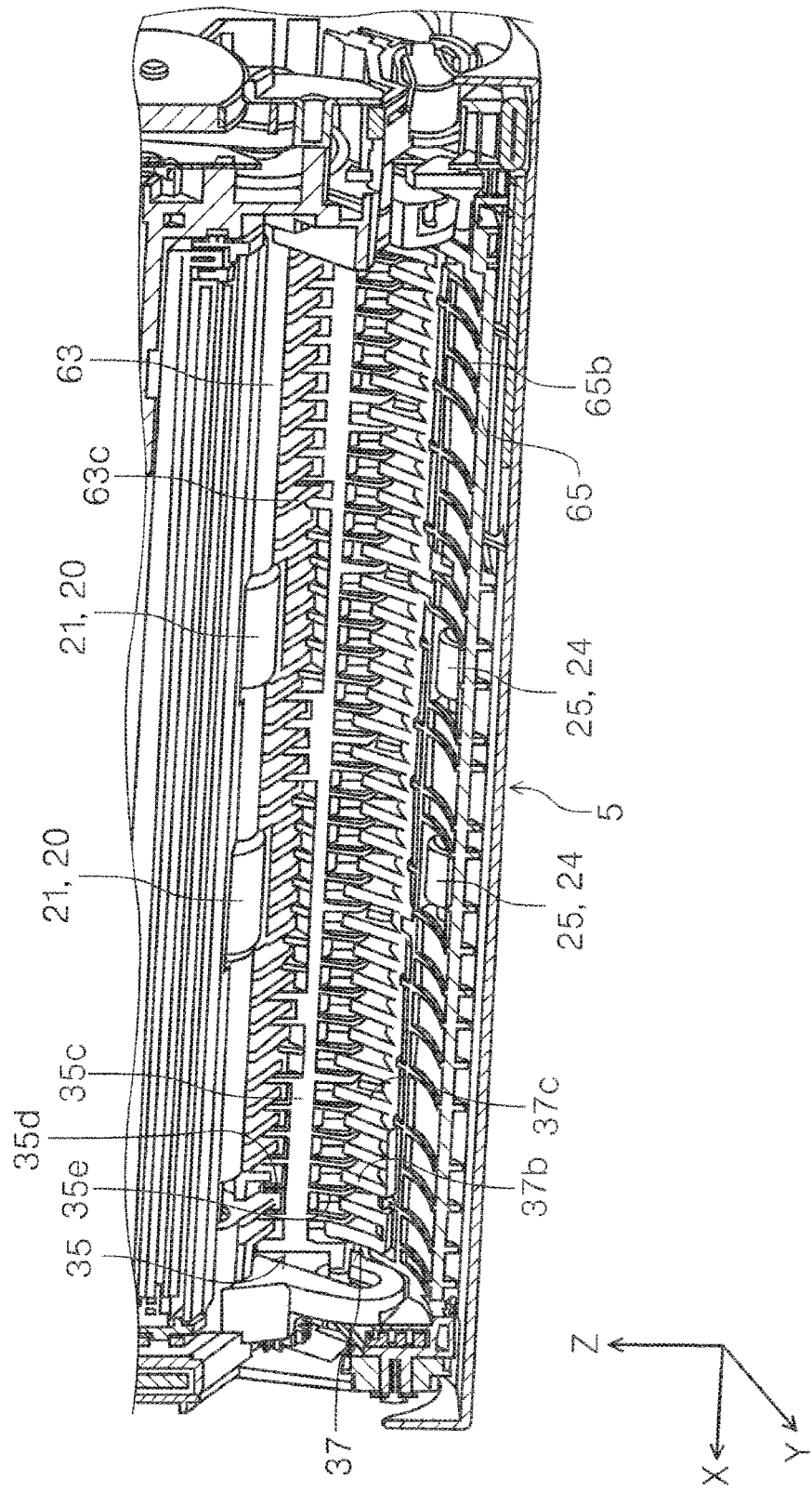
FIG. 11 is a perspective view of an outer configuration of the turning transport route.
Figure 12:
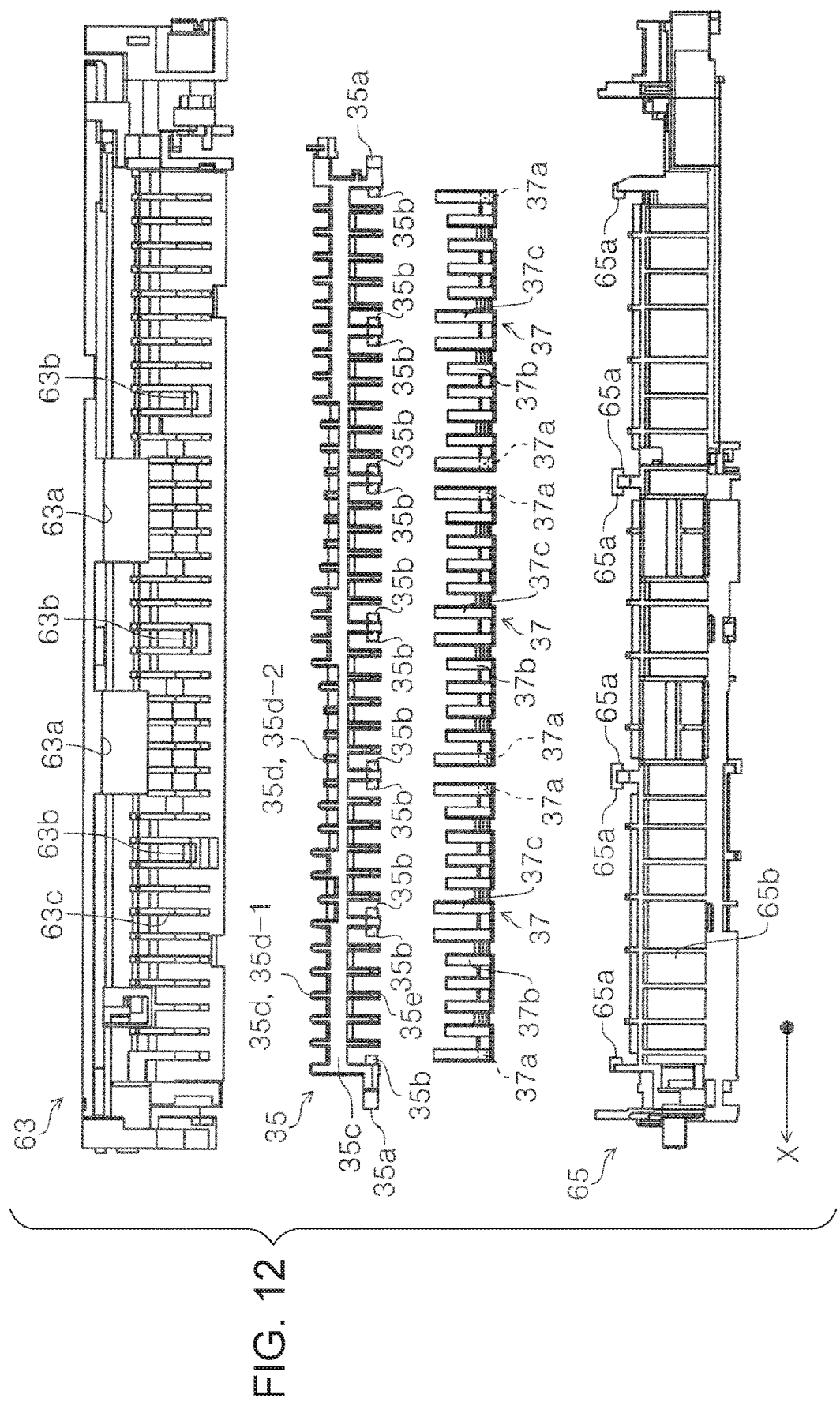
FIG. 12 is an exploded, plan view of the outer configuration of the turning transport route.
Figure 13:
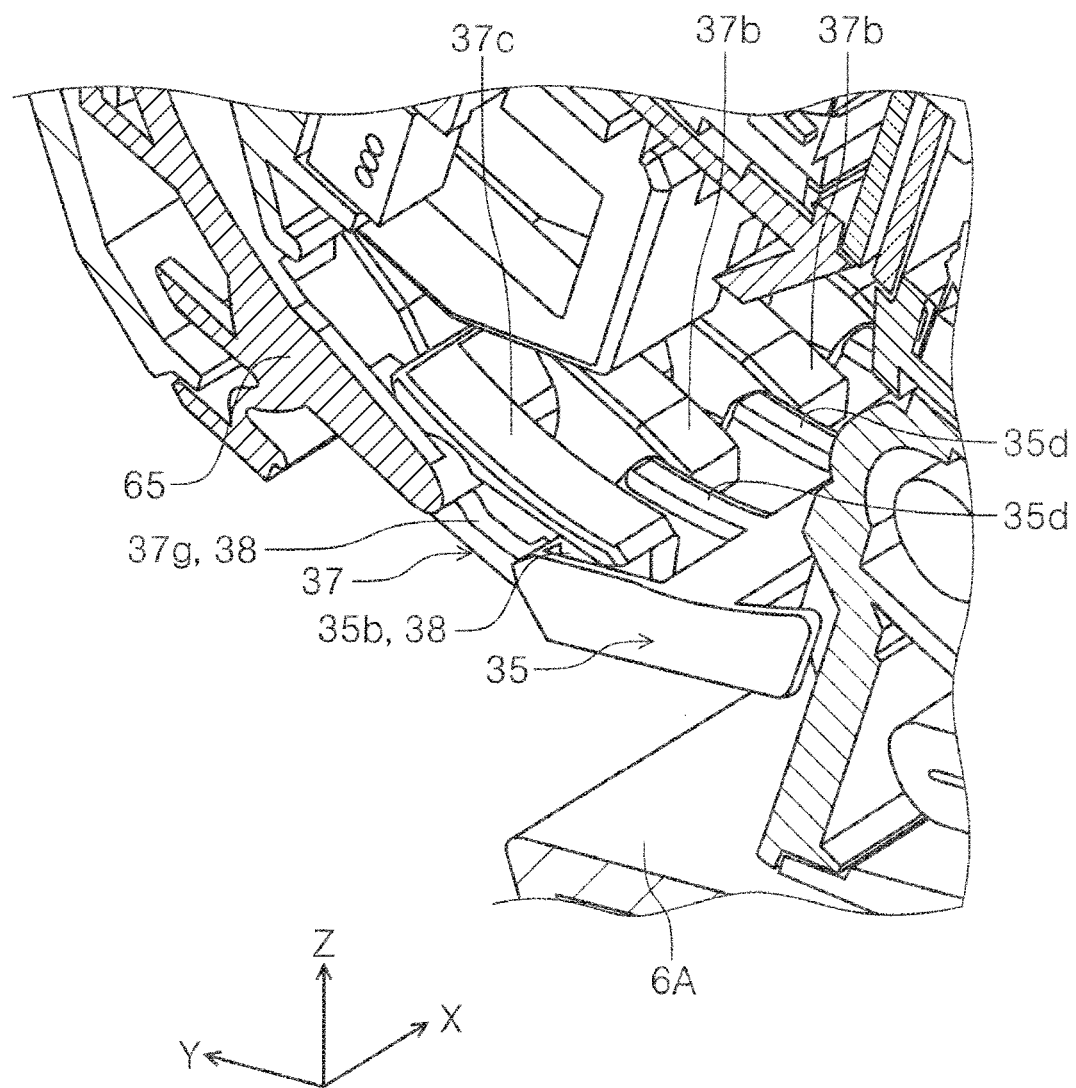
FIG. 13 is a perspective view of the flap having the first transport route coupling posture and the turning route guide member.
Figure 14:
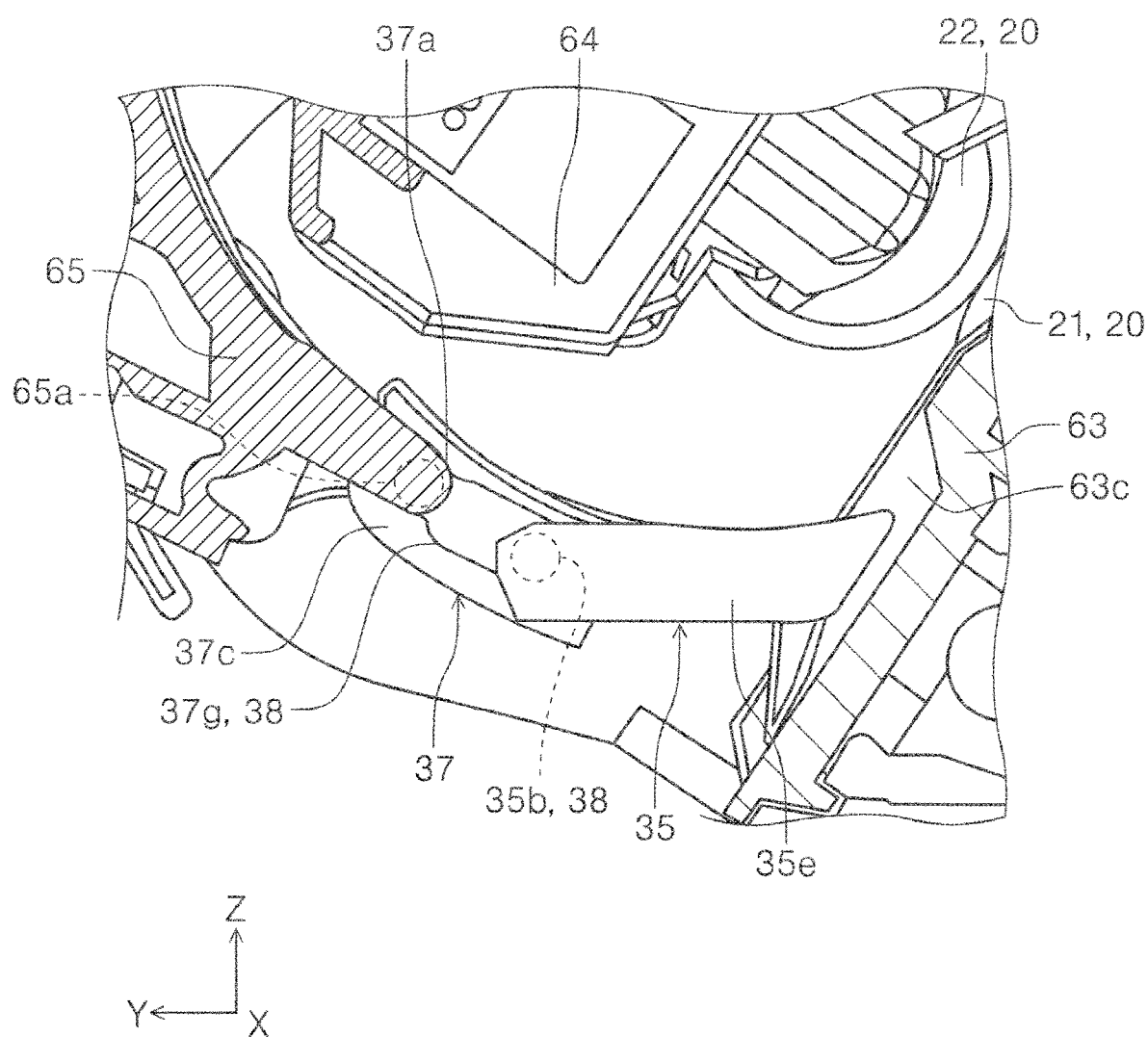
FIG. 14 is a side view of the flap having the first transport route coupling posture and the turning route guide member.

Next, the flap 35 and some surrounding components will be described below. As illustrated in FIGS. 11 and 12, a plurality of turning route guide members 37, which constitute the exterior of the turning transport route R3, are disposed downstream of the flap 35. When receiving a document P from the flap 35, the turning route guide members 37 guide the document P in the downstream direction. In this embodiment, a single flap 35 is disposed to extend in the width direction (+X direction), which intersects the transport direction of the document P, whereas three turning route guide members 37 are arranged side by side in the width direction (+X direction).

Each turning route guide member 37 has, at the ±X-ends, holes 37a into which corresponding shafts 65a formed in a third frame 65 are inserted. This configuration allows the turning route guide members 37 to rotate around the shafts 65a relative to the third frame 65. The third frame 65 may be a base component of a third unit 5 of the main body 2. Each of the flap 35 and the turning route guide members 37 has a plurality of teeth arranged in the width direction (+X direction). The lower ends of the teeth of the flap 35 engage with the upper ends of the teeth of the turning route guide members 37. Further, at least some of the teeth arranged in the width direction are coupled together.

The teeth of the flap 35 include: a plurality of second ribs 35d that protrude upstream (upward on the page of FIG. 12) from a base 35c extending in the width direction (+X direction); and a plurality of third ribs 35e that protrude downstream (downward on the page of FIG. 12) from the base 35c. The teeth of each turning route guide member 37 include fourth ribs 37b and 37c. The fourth ribs 37c are longer than the fourth ribs 37b in the transport direction. In this embodiment, the components denoted by references 37c and 37d are collectively referred to as the fourth ribs.

The flap 35 is coupled to each turning route guide member 37 via couplers 38 (see FIGS. 13 to 15, 17, and 18), each of which includes a projection 35b formed on the flap 35 and a groove 37g formed in the fourth ribs 37c of the turning route guide member 37. Coupling the flap 35 to each turning route guide member 37 in this manner provides an effect that will be described below. If a flap 35 is deformed outward from the turning transport route R3 by receiving force from a document, a reverse step may be formed between the flap 35 and each turning route guide member 37, in which case an upstream portion of the document might be stuck. In this embodiment, however, when the flap 35 is deformed by receiving force from a document, each turning route guide member 37 is also deformed together because the downstream portions of the flap 35 are partly coupled to the upstream portions of each turning route guide member 37. This configuration therefore can suppress such reverse steps from being formed, thereby helping to smoothly feed a document to the turning route guide member 37.

Figure 15:
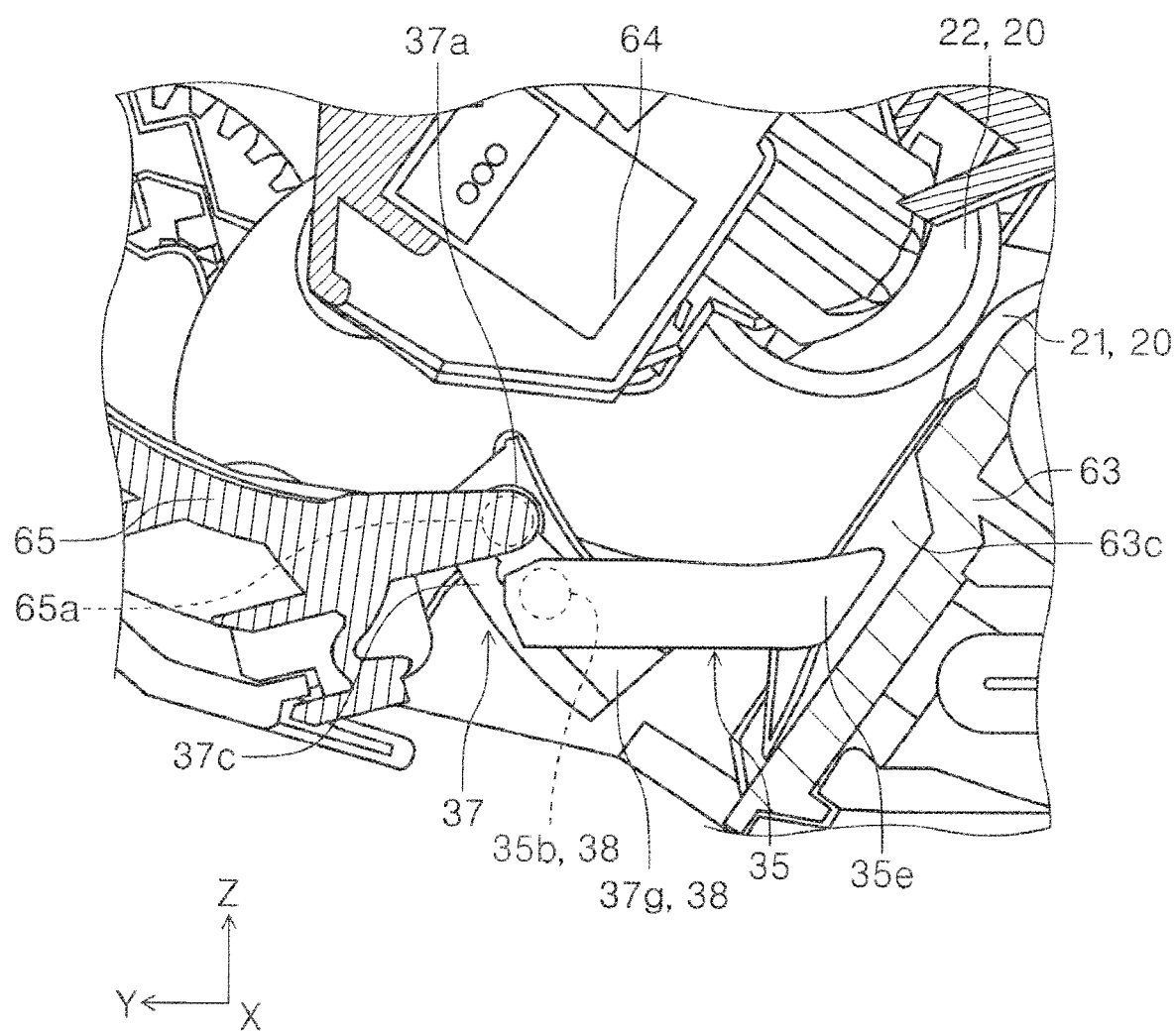
FIG. 15 is a side view of the flap and the turning route guide member when the third unit is transited from the state of FIG. 14 to the open state.

Some other effects of the couplers 38 will be described below. As described above, the main body 2 includes a first unit 3, a second unit 4, and the third unit 5. The second unit 4 is operable or closable by being rotated relative to the first unit 3 and, when in a closed state, forms the document reading route R2 with the first unit 3. The third unit 5 is operable or closable by being rotated relative to both the first unit 3 and the second unit 4 and, when in a closed state, forms the turning transport route R3 with both the first unit 3 and the second unit 4. In such configurations, when the third unit 5 is opened, some of the couplers that couple the flap 35 to each turning route guide member 37 may be damaged because the flap 35 is disposed inside the first unit 3, and the turning route guide member 37 is disposed inside the third unit 5. In this configuration, however, each coupler 38 includes the projection 35b formed in the flap 35 and the groove 37g formed in the fourth ribs 37c of the turning route guide members 37. Thus, when the third unit 5 is opened, as illustrated in FIG. 15, each turning route guide member 37 rotates relative to the third unit 5, and the projections 35b slide along the corresponding grooves 37g. This configuration therefore reduces the risk of the coupler 38 being damaged.

Figure 16:
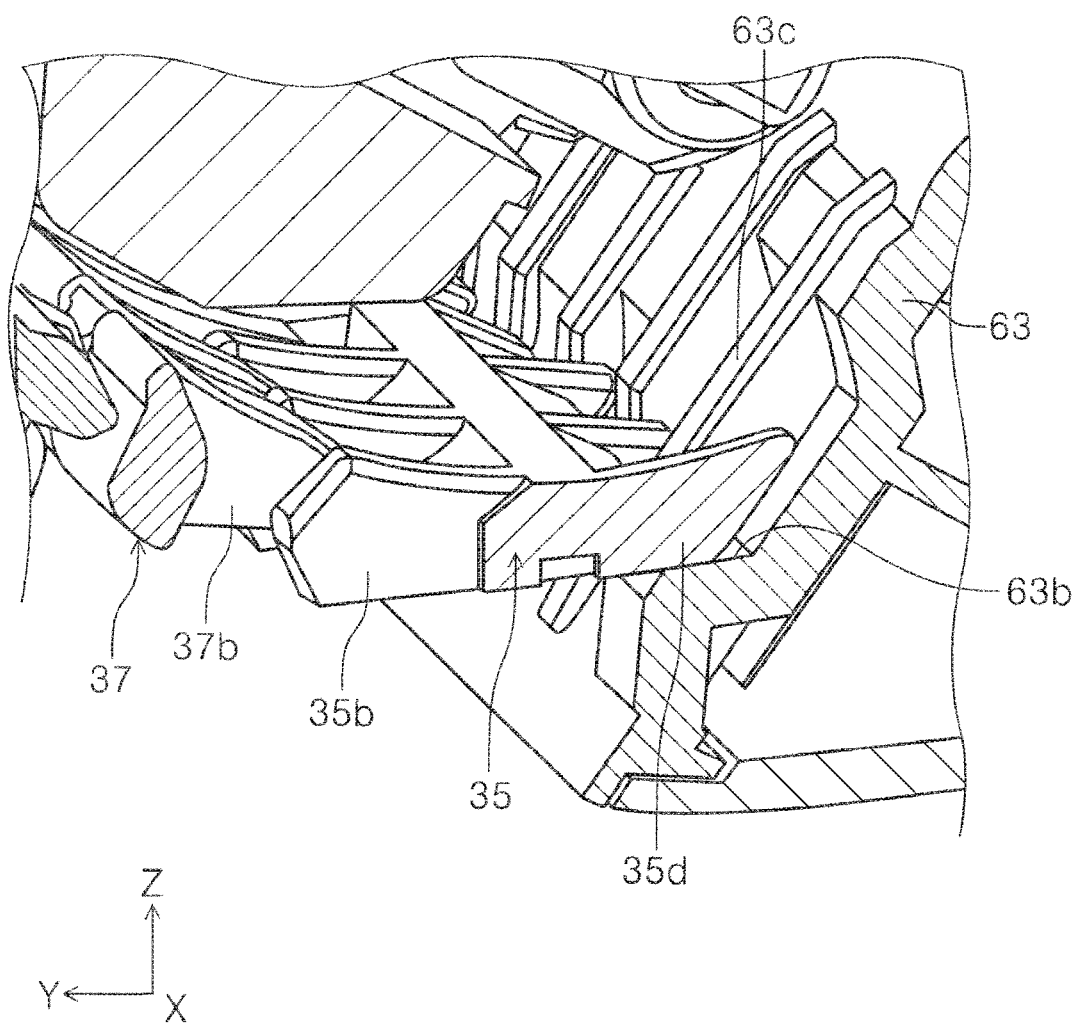
FIG. 16 is a perspective view of the flap having the first transport route coupling posture, the turning route guide member, and the first frame.

A configuration of ribs forming the exterior of the turning transport route R3 will be described below. As illustrated in FIG. 12, the first frame 63 has two apertures 63a via which the second lower rollers 21 are exposed. The first frame 63 includes, as an example of upstream ribs, a plurality of first ribs 63c that are arranged side by side in the width direction (+X direction) and extend in the transport direction of the document. The first frame 63 further includes three limiters 63b that are arranged in the width direction (+X direction) and control the first transport route coupling posture of the flap 35. When the flap 35 forms the turning transport route R3, as illustrated in FIGS. 11 and 16, the first ribs 63c formed in the first frame 63 and the second ribs 35d formed in the flap 35 are alternately arranged in the width direction (+X direction).

The second ribs 35d formed in the flap 35 include ribs denoted by references 35d-1 and 35d-2. The second ribs 35*d*-1 are longer than the second ribs 35*d*-2 in the transport direction. The second ribs 35*d*-2 are formed in relation to the respective apertures 63*a* in the width direction (+X direction).

Figure 17:
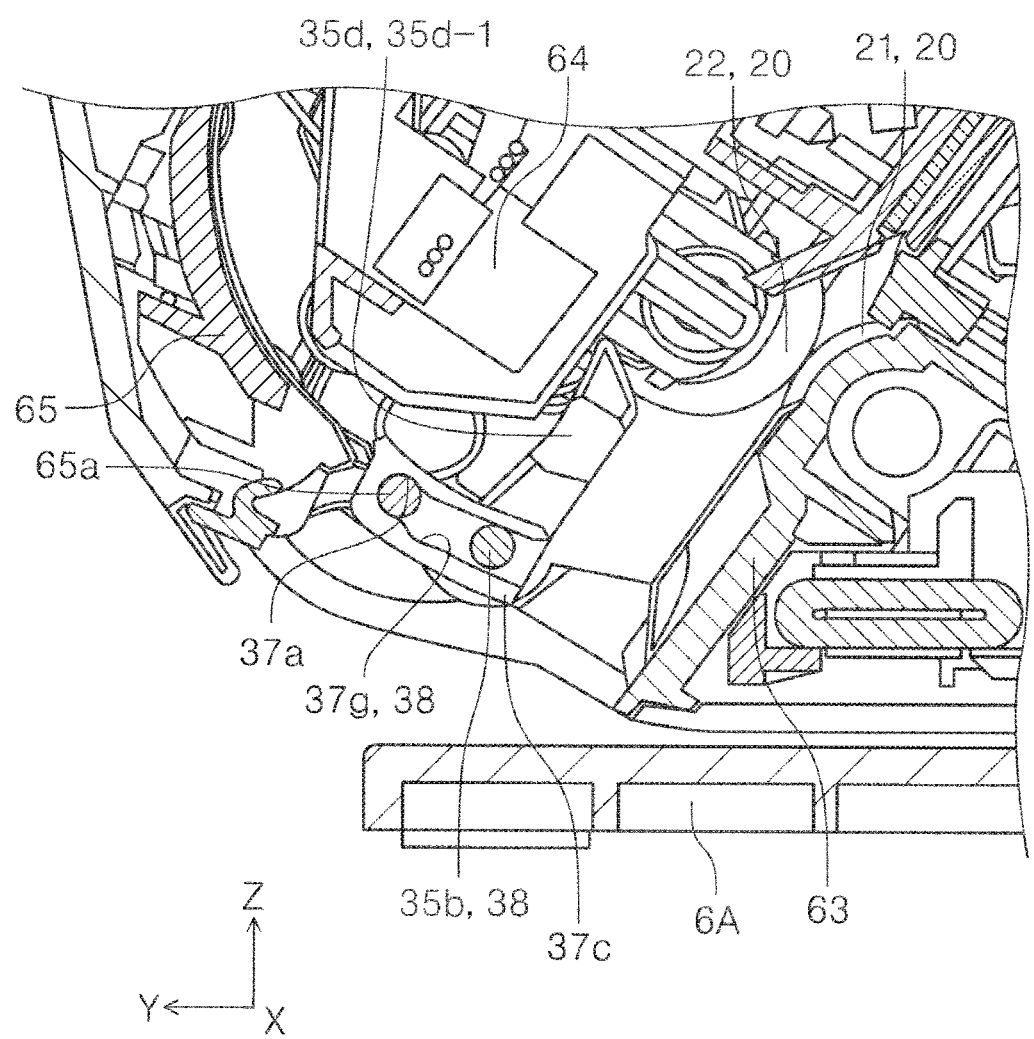
FIG. 17 is a side-sectional view of the flap having the second transport route coupling posture and the turning route guide member.
Figure 18:
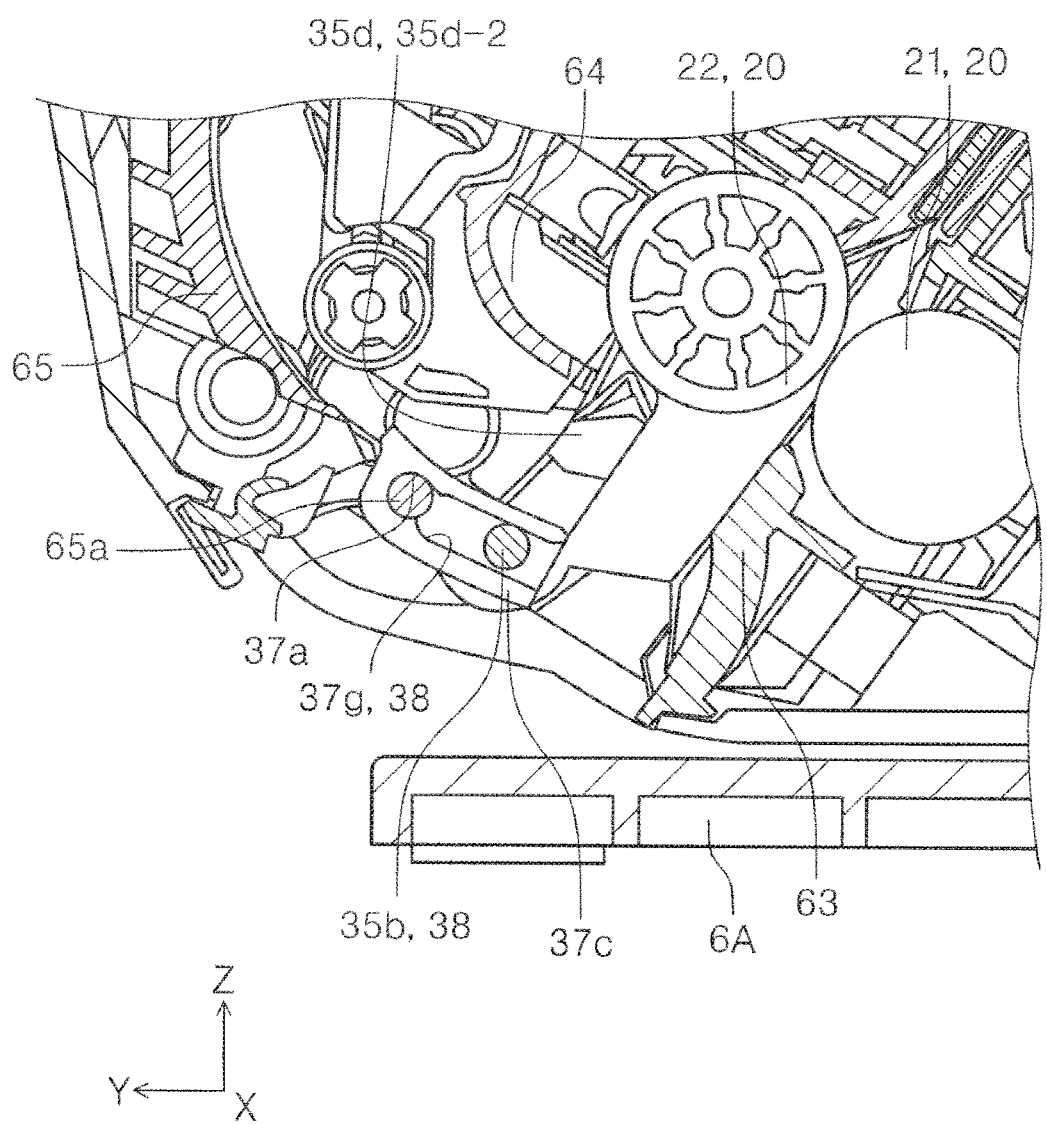
FIG. 18 is another side-sectional view of the flap having the second transport route coupling posture and the turning route guide member.

FIG. 17 illustrates the positional relationship between the second ribs 35*d*-1 and second upper rollers 22 when the flap 35 forms the unturning transport route R4. Since the second ribs 35*d*-1 extend so as to partly cover the second upper rollers 22, the second ribs 35*d*-1 help the second upper rollers 22 appropriately transport the document in the downward direction along the unturning transport route R4 even when a document is curled upward. FIG. 18 illustrates the positional relationship between the second ribs 35*d*-2 and the second upper rollers 22 when the flap 35 forms the unturning transport route R4. Since the second ribs 35*d*-2 do not cover the second upper rollers 22, they do not interfere with each other.

When a document is being transported along the turning transport route R3, the first surface of the document is guided by the first frame 63 (an example of an upstream guide member) disposed upstream of the flap 35 and then also guided by both the flap 35 and the turning route guide members 37. After that, the first surface is further guided by the third frame 65 (an example of a downstream guide member) disposed downstream of the turning route guide members 37. The third frame 65 includes a plurality of fifth ribs 65*b* arranged side by side in the width direction (+X direction); the fifth ribs 65*b* are an example of downstream ribs extending in the transport direction of the document. In a direction normal to the first and second surfaces of the document, each of the first ribs 63*c* and the fifth ribs 65*b* is lower than any of the second ribs 35*d* and the third ribs 35*e* forming the teeth of the flap 35 and also lower than any of the fourth ribs 37*b* and 37*c* forming the teeth of the turning route guide members 37.

In this embodiment, the numbers of first ribs 63*c*, second ribs 35*d*, third ribs 35*e*, and fourth ribs 37*b* and 37*c* may be the same as one another and are each greater than the number of fifth ribs 65*b*.

Figure 22:
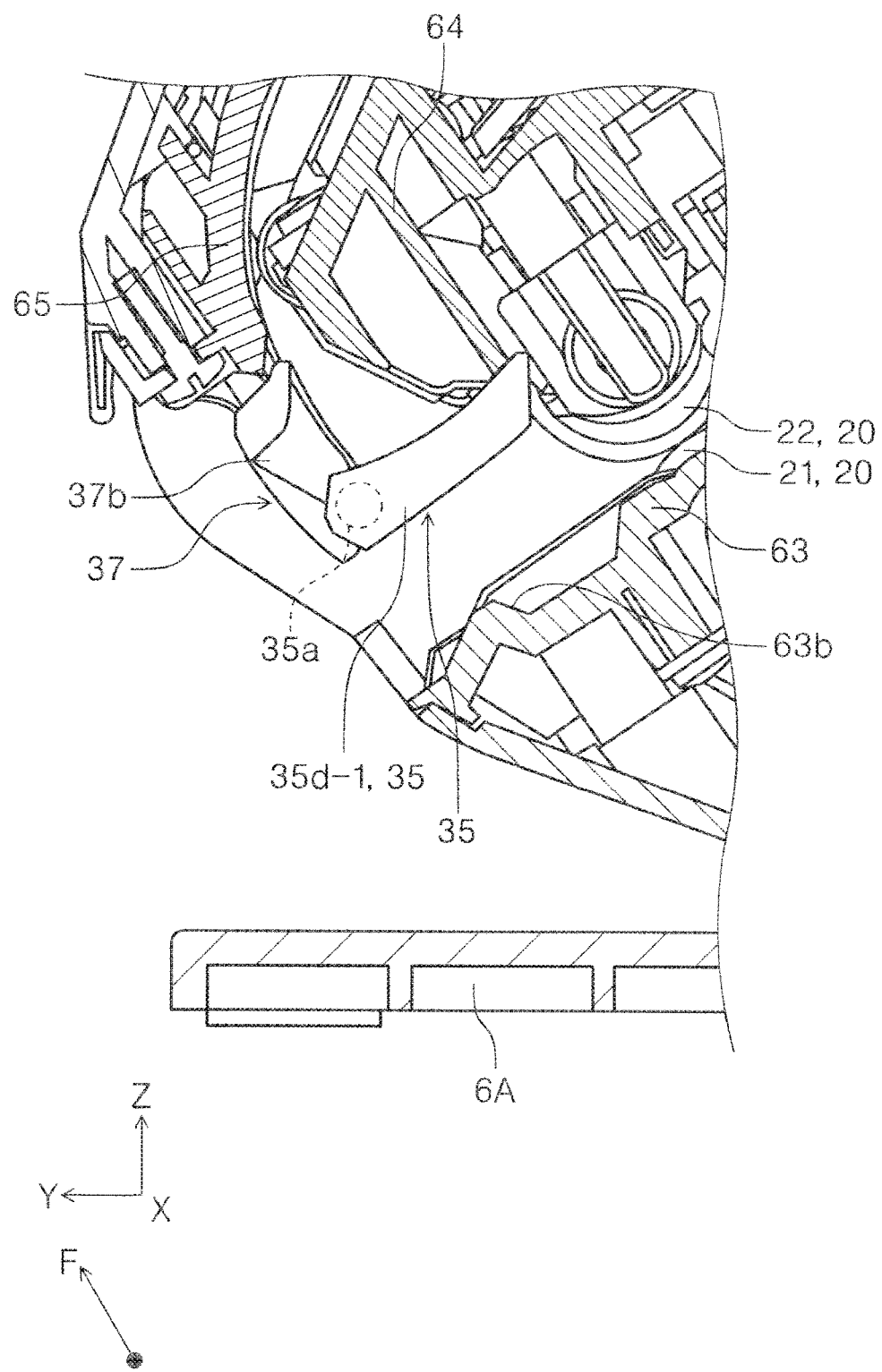
FIG. 22 is a perspective view of the flap having the second transport route coupling posture and the turning route guide member.

Some other effects of the foregoing second embodiment will be described below. As illustrated in FIGS. 20 and 22, a flap rotation shaft 35*a* that forms the rotation axis of the flap 35 is disposed adjacent to a first ejection port 75 (the +F-side) with respect to the document reading route R2 in the direction (+F direction) normal to the first and second surfaces of the document being transported along the document reading route R2 (see FIGS. 5 and 6). Furthermore, the flap rotation shaft 35*a* is disposed adjacent to the first ejection port 75 (+F-side), in the +F direction, with respect to the document nip locations of the first transport roller pair 16 and the second transport roller pair 20. Moreover, the flap rotation shaft 35*a* is disposed adjacent to the first ejection port 75 (+F-side), in the +F direction, with respect to the locations at which the first reader 32 reads the document and at which the second reader 33 reads the document. Likewise, as illustrated in FIGS. 19 and 21, a rotation shaft 63*e* that forms the rotation axis of the switching member 47 is disposed adjacent to the first ejection port 75 (the +F-side) with respect to the document reading route R2 in the +F direction.

Third Embodiment

Figure 23:
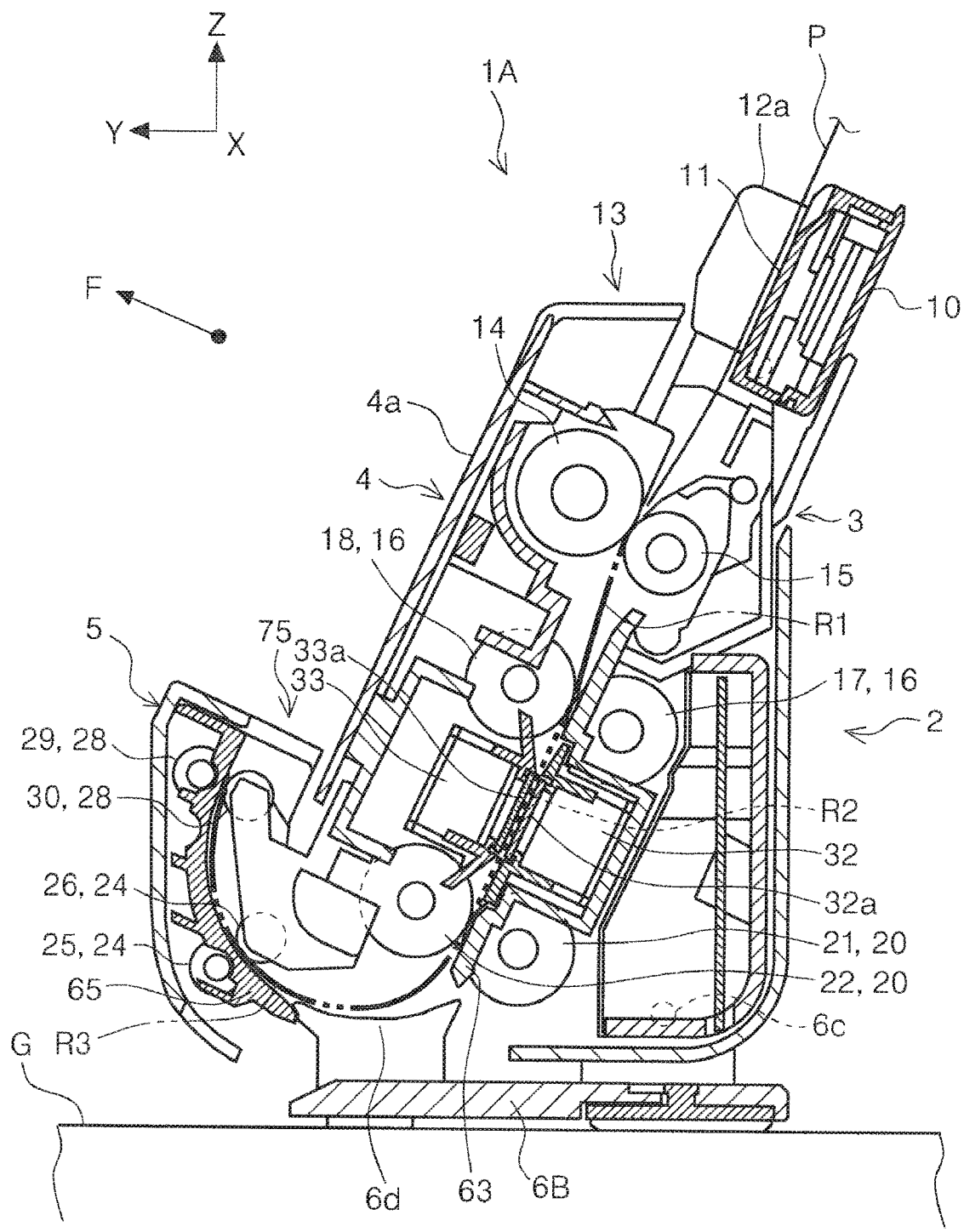
FIG. 23 is a sectional view of a route-forming section that couples a document reading route to a turning transport route.
Figure 24:
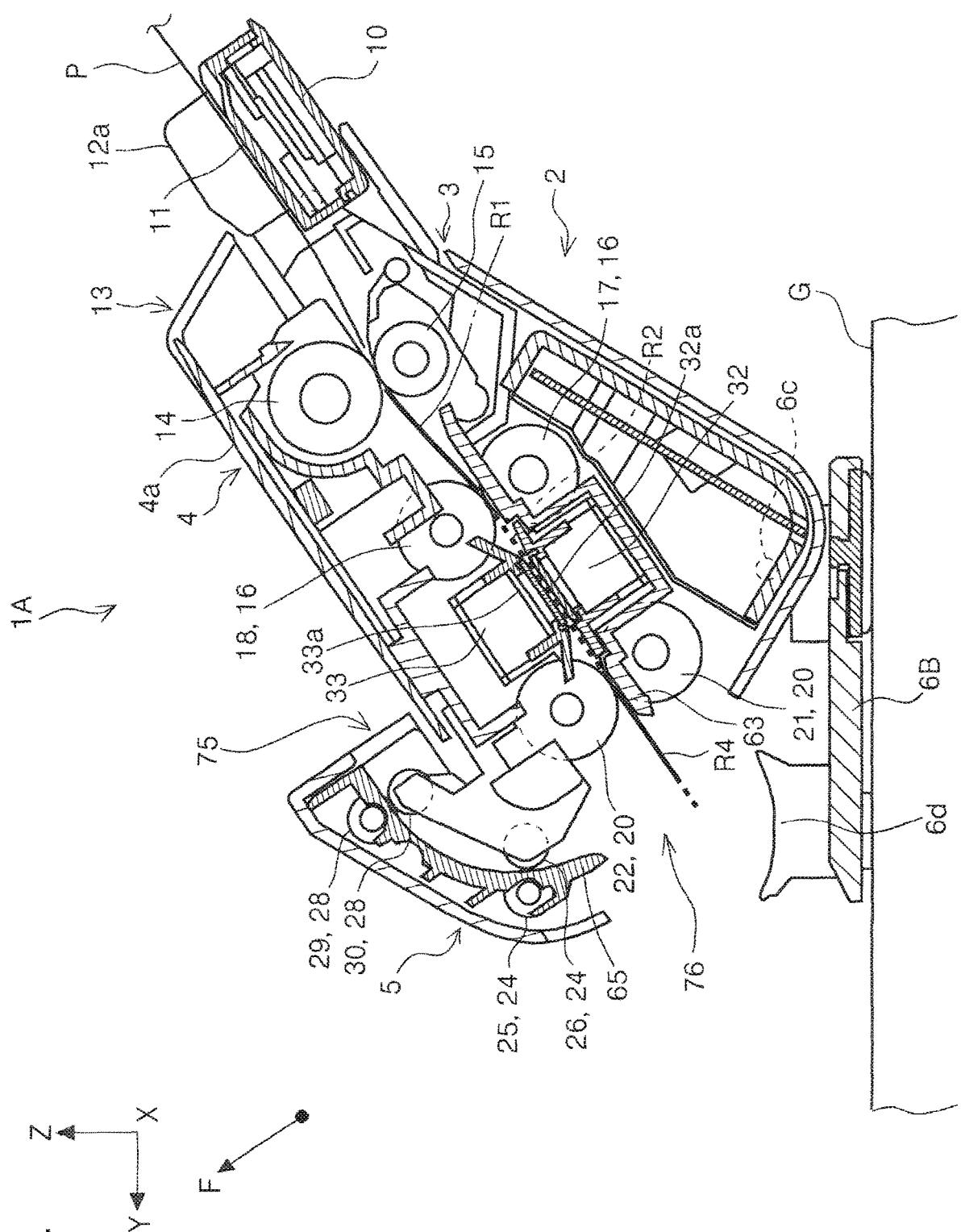
FIG. 24 is a sectional view of the route-forming section that couples the document reading route to an unturning transport route.

With reference to FIGS. 23 and 24, a third embodiment of the present disclosure will be described below regarding a configuration of selectively coupling a document reading route R2 to either a turning transport route R3 or an unturning transport route R4. FIGS. 23 and 24 are each a side-sectional view of a document transport route inside a scanner 1A according to the third embodiment. In this embodiment, a portion of a main-body support 6B is formed as a route-forming section 6*d* that forms the exterior of a turning transport route R3. When a main body 2 is switched to a regular reading posture, as illustrated in FIG. 23, the route-forming section 6*d* couples the document reading route R2 to the turning transport route R3. When the main body 2 is switched to a booklet reading posture, as illustrated in FIG. 24, the route-forming section 6*d* couples the document reading route R2 to the unturning transport route R4. This configuration selects an appropriate transport route in accordance with the posture of the main body 2 without involving a specific operation of switching the posture of the flap 34; it is therefore possible to provide improved usability.

Fourth Embodiment

Figure 25:
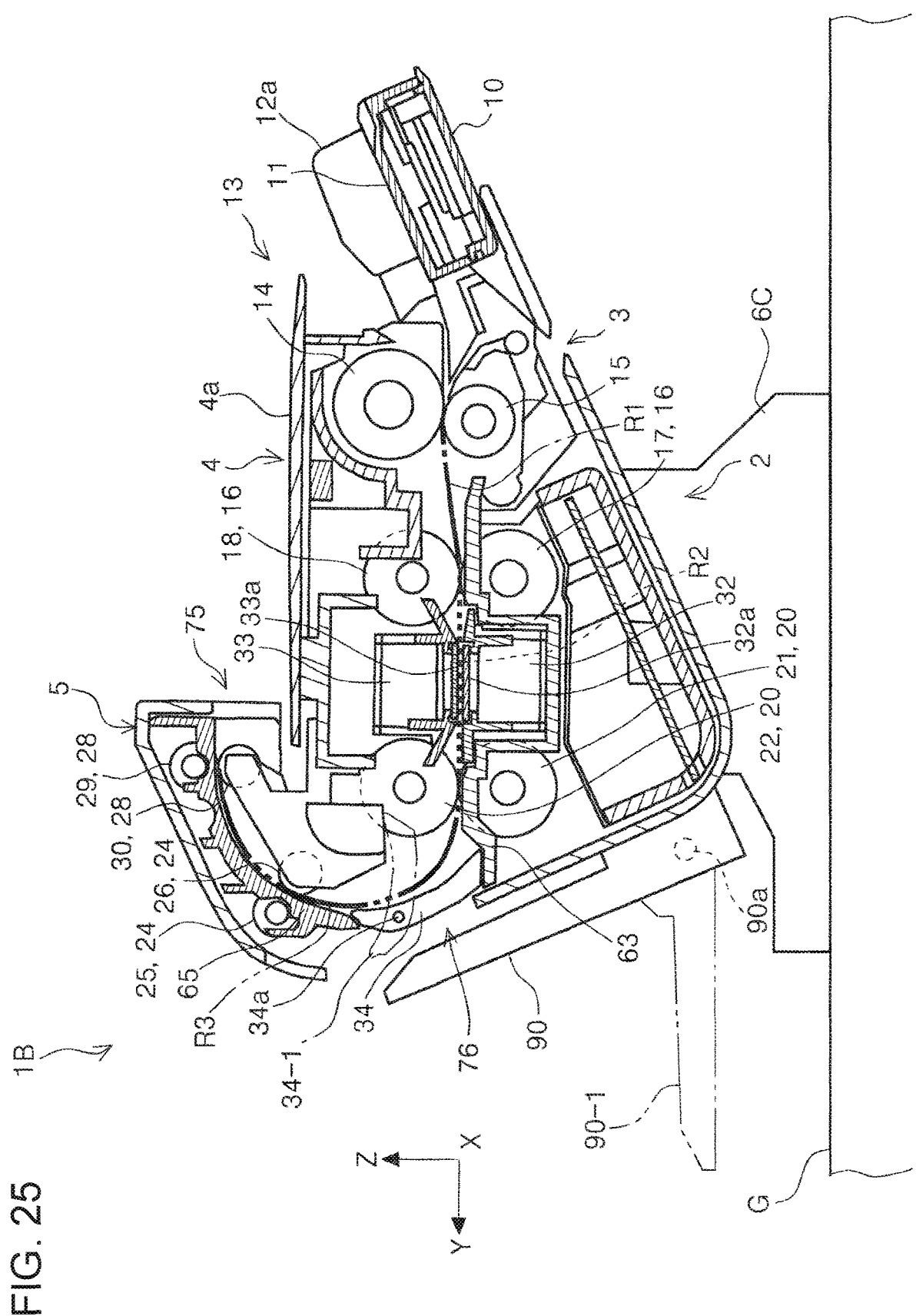
FIG. 25 is a sectional view of a route-forming section that couples a document reading route to a turning transport route.

With reference to FIG. 25, a fourth embodiment of the present disclosure will be described below regarding a configuration of selectively coupling a document reading route R2 to either a turning transport route R3 or an unturning transport route R4. FIG. 25 is a side-sectional view of a document transport route inside a scanner 1B according to the fourth embodiment. The scanner 1B is configured such that a main body 2 supported by a main-body support 6C is not rotatable relative to the main-body support 6C unlike the scanners 1 and 1A according to the foregoing first to third embodiments. In this embodiment, the scanner 1B includes an exposing/hiding unit 90 instead of the main-body support 6 in the first embodiment or the main-body support 6A in the second embodiment. The exposing/hiding unit 90 is rotatable around a rotation shaft 90*a*. By rotating the exposing/hiding unit 90, the +Y-side of the main body 2 is exposed or hidden, and a second ejection port 76 via which a document P being transported along an unturning transport route R4 is to be ejected is also exposed or hidden. The alternate long and two short dashes line and reference 90-1 denote the exposing/hiding unit 90 in the exposing state.

The scanner 1B according to this embodiment differs from the above scanners 1 and 1A only in including the above exposing/hiding unit 90 instead of the main-body support 6 in the first embodiment. The scanner 1B thus also includes a transport route switching section 40A described in the first embodiment. The method of switching the posture of the main body 2 in the first embodiment may be applied to that of opening or closing the exposing/hiding unit 90. The scanner 1B also includes a flap 34 described in the first embodiment, which is rotatable and forms the exterior of a turning transport route R3. When the exposing/hiding unit 90 is closed, the flap 34 has a first transport route coupling posture by which the document reading route R2 is coupled to the turning transport route R3. When the exposing/hiding unit 90 is open, the flap 34 has a second transport route coupling posture by which the document reading route R2 is coupled to the unturning transport route R4, as indicated by the alternate long and two short dashes line and reference 34-1. A transport route switching section in this embodiment may be identical to the transport route switching section 40A described with reference to FIGS. 7 to 10. The switching member 41 is configured to engage with both the exposing/hiding unit 90 and the flap 34. In response to the opening or closing of the exposing/hiding unit 90, the engagement of the switching member 41 with the exposing/hiding unit 90 changes, thereby rotating the flap 34 to switch the transport route to which the document reading route R2 is coupled. This configuration selects an appropriate transport route in accordance with the posture of the main body 2 without involving a specific operation of switching the posture of the flap 34; it is therefore possible to provide improved usability.

Instead of the flap 34 in the first embodiment, the scanner 1B according to this embodiment may include a flap 35 and a transport route switching section 40B in the second embodiment. In addition, the exposing/hiding unit 90 may include a route-forming section 6d in the third embodiment which has been described with reference to the FIGS. 23 and 24.

The present disclosure is not limited to the foregoing first to fourth embodiments and may be modified in various ways within the scope of the claims. Obviously, these modifications fall within the scope of the claims. For example, although a medium transport apparatus is applied to image reading apparatuses in the foregoing first to fourth embodiments, it may also be applied to recording apparatuses that record information on documents. An example of such recording apparatuses is ink jet printers equipped with recording heads that discharge ink onto documents. By replacing the second readers 33 in the scanners 1, 1A, and 1B in the foregoing first to fourth embodiments with recording heads, recording apparatuses can be realized.

What is claimed is:

1. A medium transport apparatus comprising:
   a main-body support mounted on an installation surface of the medium transport apparatus; and
   a main body supported by the main-body support,
   the main body including
      a first transport route along which a medium is to be transported,
      a second transport route that includes a turning route by which the medium being transported is to be turned upward and from which the medium that was turned by the turning route is to be ejected, the second transport route being disposed downstream of the first transport route,
      a third transport route from which the medium being transported is to be ejected without being turned, the third transport route being disposed downstream of the first transport route, and
      a transport route switching section that switches a medium transport route to which the first transport route is coupled, between the second transport route and the third transport route, wherein
   the main body is rotatably attached to the main-body support and is switchable between a first posture and a second posture by being rotated,
   an angle between the first transport route and the installation surface when the main body is switched to the first posture is greater than the angle between the first transport route and the installation surface when the main body is switched to the second posture,
   the turning route has an exterior formed by a route-forming member, the route-forming member being rotatable,
   when the main body is switched to the first posture, the route-forming member has a first transport route coupling posture by which the first transport route is coupled to the second transport route,
   when the main body is switched to the second posture, the route-forming member has a second transport route coupling posture by which the first transport route is coupled to the third transport route,
   the transport route switching section has a switching member that engages with both the main-body support and the route-forming member, the switching member being a rotatable member, and
   in response to switching between the first posture and the second posture of the main body, engagement of the switching member with the main-body support changes to rotate the route-forming member and to switch the medium transport route to which the first transport route is coupled, wherein
   the transport route switching section includes a first pushing member and a second pushing member, the first pushing member being configured to push the route-forming member so as to have the first transport route coupling posture, the second pushing member being configured to push the switching member in a direction in which the switching member pushes the route-forming member so as to have the second transport route coupling posture,
   pushing force of the second pushing member is greater than pushing force of the first pushing member,
   when the main body is switched to the first posture, the switching member abuts against the main-body support and does not push the route-forming member, and the route-forming member receives the pushing force of the first pushing member and has the first transport route coupling posture, and
   when the main body is switched to the second posture, the switching member moves away from the main-body support and pushes the route-forming member against the pushing force of the first pushing member, and the route-forming member has the second transport route coupling posture.

2. The medium transport apparatus according to claim 1, wherein
   the first pushing member is attached to both the switching member and the route-forming member,
   when the main body is switched to the first posture, the switching member abuts against the main-body support, and the route-forming member receives the pushing force of the first pushing member and has the first transport route coupling posture, and
   when the main body is switched to the second posture, the switching member moves away from the main-body support and pushes the route-forming member, and the route-forming member has the second transport route coupling posture.

3. The medium transport apparatus according to claim 2, further comprising a turning route guide member that receives a medium from the route-forming member and guides the medium in a downstream direction, the turning route guide member being a member forming the exterior of the turning route, the turning route guide member being disposed downstream of the route-forming member, wherein
   each of the route-forming member and the turning route guide member has a plurality of teeth arranged in a width direction, the width direction intersecting a transport direction of the medium, and
   lower ends of the teeth of the route-forming member engage with upper ends of the teeth of the turning route guide member, and at least some of the teeth arranged in the width direction are coupled together.

4. The medium transport apparatus according to claim 3, wherein
   the main body includes a first unit, a second unit, and a third unit, the second unit being operable or closable by being rotated relative to the first unit, the second unit being configured to form the first transport route with the first unit when in a closed state, the third unit being operable or closable by being rotated relative to both the first unit and the second unit, the third unit being configured to form the second transport route with both the first unit and the second unit when in a closed state, the route-forming member is disposed inside the first unit, the turning route guide member is disposed inside the third unit so as to be rotatable relative to the third unit, the route-forming member is coupled to the turning route guide member via a coupler, the coupler includes a projection and a groove, the projection being formed in one of the route-forming member and the turning route guide member, the groove being formed in the other of the route-forming member and the turning route guide member, the projection being inserted into the groove, and when the third unit is opened or closed by being rotated relative to the first unit, the turning route guide member rotates relative to the third unit, and the projection slides along the groove.

5. The medium transport apparatus according to claim 3, wherein when the first transport route is coupled to the second transport route, a first surface of a medium is guided by an upstream guide member disposed upstream of the route-forming member, then guided by both the route-forming member and the turning route guide member, after which the first surface is guided by a downstream guide member disposed downstream of the turning route guide member, the first surface of the medium being one surface of the medium, the upstream guide member has a plurality of upstream ribs that extend in the transport direction of the medium and that are arranged in the width direction, the downstream guide member has a plurality of downstream ribs that extend in the transport direction of the medium and that are arranged in the width direction, and in a direction normal to the surface of the medium, the upstream ribs and the downstream ribs are lower than the teeth of the route-forming member and also lower than the teeth of the turning route guide member.

6. The medium transport apparatus according to claim 1, wherein in a direction normal to a surface of a medium being transported along the first transport route, a rotational center of the route-forming member is positioned adjacent to an ejection port with respect to the first transport route, the medium to be ejected from the third transport route via the ejection port.

7. The medium transport apparatus according to claim 1, wherein in a direction normal to a surface of a medium being transported along the first transport route, a rotational center of the switching member is positioned apart from the first transport route and adjacent to the turning route.

8. An image reading apparatus comprising:
the medium transport apparatus according to claim 1; and
a reader that reads a medium, the reader being disposed on the first transport route in the medium transport apparatus.

9. A medium transport apparatus comprising:
a main-body support mounted on an installation surface of the medium transport apparatus; and
a main body supported by the main-body support,
the main body including
a first transport route along which a medium is to be transported, a second transport route that includes a turning route by which the medium being transported is to be turned upward and from which the medium that was turned by the turning route is to be ejected, the second transport route being disposed downstream of the first transport route, and a third transport route from which the medium being transported is to be ejected without being turned, the third transport route being disposed downstream of the first transport route, wherein the main body is rotatably attached to the main-body support and is switchable between a first posture and a second posture by being rotated, an angle between the first transport route and the installation surface when the main body is switched to the first posture is greater than the angle between the first transport route and the installation surface when the main body is switched to the second posture, a portion of the main-body support is a route-forming member that forms an exterior of the turning route, the route-forming member being a portion that projects from a surface of the main-body support such that, when the main body is switched to the first posture, the route-forming member couples the first transport route to the second transport route, and when the main body is switched to the second posture, the route-forming member couples the first transport route to the third transport route.

10. A medium transport apparatus comprising:
a main-body support mounted on an installation surface of the medium transport apparatus; and
a main body supported by the main-body support,
the main body including
a first transport route along which a medium is to be transported, a second transport route that includes a turning route by which the medium being transported is to be turned upward and from which the medium that was turned by the turning route is to be ejected, the second transport route being disposed downstream of the first transport route, a third transport route from which the medium being transported is to be ejected without being turned, the third transport route being disposed downstream of the first transport route, and a transport route switching section that switches a medium transport route to which the first transport route is coupled, between the second transport route and the third transport route, wherein the main body is rotatably attached to the main-body support and is switchable between a first posture and a second posture by being rotated, an angle between the first transport route and the installation surface when the main body is switched to the first posture is greater than the angle between the first transport route and the installation surface when the main body is switched to the second posture, the turning route has an exterior formed by a route-forming member, the route-forming member being rotatable, when the main body is switched to the first posture, the route-forming member has a first transport route coupling posture by which the first transport route is coupled to the second transport route, when the main body is switched to the second posture, the route-forming member has a second transport route coupling posture by which the first transport route is coupled to the third transport route, the transport route switching section has a switching member that engages with both the main-body support and the route-forming member, the switching member being a rotatable member, and in response to switching between the first posture and the second posture of the main body, engagement of the switching member with the main-body support changes to rotate the route-forming member and to switch the medium transport route to which the first transport route is coupled, wherein the transport route switching section includes a first pushing member and a second pushing member, the first pushing member being configured to push the route-forming member so as to have the first transport route coupling posture, the second pushing member being configured to push the switching member in a direction in which the switching member pushes the route-forming member so as to have the second transport route coupling posture, the first pushing member is attached to both the switching member and the route-forming member, when the main body is switched to the first posture, the switching member abuts against the main-body support, and the route-forming member receives the pushing force of the first pushing member and has the first transport route coupling posture, and when the main body is switched to the second posture, the switching member moves away from the main-body support and pushes the route-forming member, and the route-forming member has the second transport route coupling posture.

11. The medium transport apparatus according to claim 10, further comprising a turning route guide member that receives a medium from the route-forming member and guides the medium in a downstream direction, the turning route guide member being a member forming the exterior of the turning route, the turning route guide member being disposed downstream of the route-forming member, wherein each of the route-forming member and the turning route guide member has a plurality of teeth arranged in a width direction, the width direction intersecting a transport direction of the medium, and lower ends of the teeth of the route-forming member engage with upper ends of the teeth of the turning route guide member, and at least some of the teeth arranged in the width direction are coupled together.

12. The medium transport apparatus according to claim 11, wherein the main body includes a first unit, a second unit, and a third unit, the second unit being operable or closable by being rotated relative to the first unit, the second unit being configured to form the first transport route with the first unit when in a closed state, the third unit being operable or closable by being rotated relative to both the first unit and the second unit, the third unit being configured to form the second transport route with both the first unit and the second unit when in a closed state, the route-forming member is disposed inside the first unit, the turning route guide member is disposed inside the third unit so as to be rotatable relative to the third unit, the route-forming member is coupled to the turning route guide member via a coupler, the coupler includes a projection and a groove, the projection being formed in one of the route-forming member and the turning route guide member, the groove being formed in the other of the route-forming member and the turning route guide member, the projection being inserted into the groove, and when the third unit is opened or closed by being rotated relative to the first unit, the turning route guide member rotates relative to the third unit, and the projection slides along the groove.

13. The medium transport apparatus according to claim 12, wherein when the first transport route is coupled to the second transport route, a first surface of a medium is guided by an upstream guide member disposed upstream of the route-forming member, then guided by both the route-forming member and the turning route guide member, after which the first surface is guided by a downstream guide member disposed downstream of the turning route guide member, the first surface of the medium being one surface of the medium, the upstream guide member has a plurality of upstream ribs that extend in the transport direction of the medium and that are arranged in the width direction, the downstream guide member has a plurality of downstream ribs that extend in the transport direction of the medium and that are arranged in the width direction, and in a direction normal to the surface of the medium, the upstream ribs and the downstream ribs are lower than the teeth of the route-forming member and also lower than the teeth of the turning route guide member.

14. The medium transport apparatus according to claim 10, wherein in a direction normal to a surface of a medium being transported along the first transport route, a rotational center of the route-forming member is positioned adjacent to an ejection port with respect to the first transport route, the medium to be ejected from the third transport route via the ejection port.

15. The medium transport apparatus according to claim 10, wherein in a direction normal to a surface of a medium being transported along the first transport route, a rotational center of the switching member is positioned apart from the first transport route and adjacent to the turning route.

16. An image reading apparatus comprising:
the medium transport apparatus according to claim 10; and
a reader that reads a medium, the reader being disposed on the first transport route in the medium transport apparatus.

* * * * *